(12) United States Patent
Ueyama

(10) Patent No.: US 9,363,428 B2
(45) Date of Patent: Jun. 7, 2016

(54) IMAGE PROCESSING APPARATUS AND METHOD

(75) Inventor: Teruhiko Ueyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 653 days.

(21) Appl. No.: 12/704,718

(22) Filed: Feb. 12, 2010

(65) Prior Publication Data

US 2010/0208118 A1 Aug. 19, 2010

(30) Foreign Application Priority Data

Feb. 17, 2009 (JP) ................................ 2009-034027
Feb. 17, 2009 (JP) ................................ 2009-034028
Feb. 17, 2009 (JP) ................................ 2009-034029
Feb. 17, 2009 (JP) ................................ 2009-034030

(51) Int. Cl.
*H04N 5/228* (2006.01)
*H04N 5/222* (2006.01)
*H04N 5/232* (2006.01)

(52) U.S. Cl.
CPC ........... *H04N 5/232* (2013.01); *H04N 5/23293* (2013.01)

(58) Field of Classification Search
CPC ............................ H04N 5/23293; H04N 5/232
USPC ............... 348/208.99–208.3, 333.01–333.02, 348/333.04, 333.12; 396/52, 53, 55
See application file for complete search history.

(56) References Cited

U.S. PATENT DOCUMENTS 5,335,032 A * 8/1994 Onuki et al. ..................... 396/50
5,794,078 A * 8/1998 Okazaki ........................... 396/50
6,317,114 B1 * 11/2001 Abali et al. ..................... 345/672
6,747,690 B2 * 6/2004 M.o slashed.lgaard .... 348/208.1
6,873,357 B2 * 3/2005 Fuchimukai et al. ....... 348/208.2
2009/0207184 A1 * 8/2009 Laine et al. .................... 345/619
2011/0205375 A1 * 8/2011 Molgaard .................. 348/208.2

FOREIGN PATENT DOCUMENTS

| CN | 1470934 A | 1/2004 |
|---|---|---|
| JP | 2000-125184 A | 4/2000 |
| JP | 2000-148351 A | 5/2000 |
| JP | 4009887 B2 | 11/2007 |
| JP | 2008-117256 A | 5/2008 |
| JP | 2008-136696 A | 6/2008 |
| JP | 2009-302808 A | 12/2009 |

OTHER PUBLICATIONS

Sakaurai et al. (JP 2000-148351, May 26, 2000, Machine Translated Version, see Detailed Description and Drawings).*

* cited by examiner

*Primary Examiner* — Twyler Haskins
*Assistant Examiner* — Carramah J Quiett
(74) *Attorney, Agent, or Firm* — Canon USA, Inc. IP Division

(57) ABSTRACT

An apparatus includes an imaging unit configured to output an image signal of a captured image, a display unit configured to display the image signal as an image, a swing detection unit configured to detect a component of acceleration of a swinging operation, an operation detection unit configured to detect the swinging operation, and a control unit to change the image to be displayed on the display unit based on the swinging operation, wherein the operation detection unit is configured, if the acceleration signal reaches a first and a second threshold values, to determine that the apparatus has been swung.

21 Claims, 15 Drawing Sheets

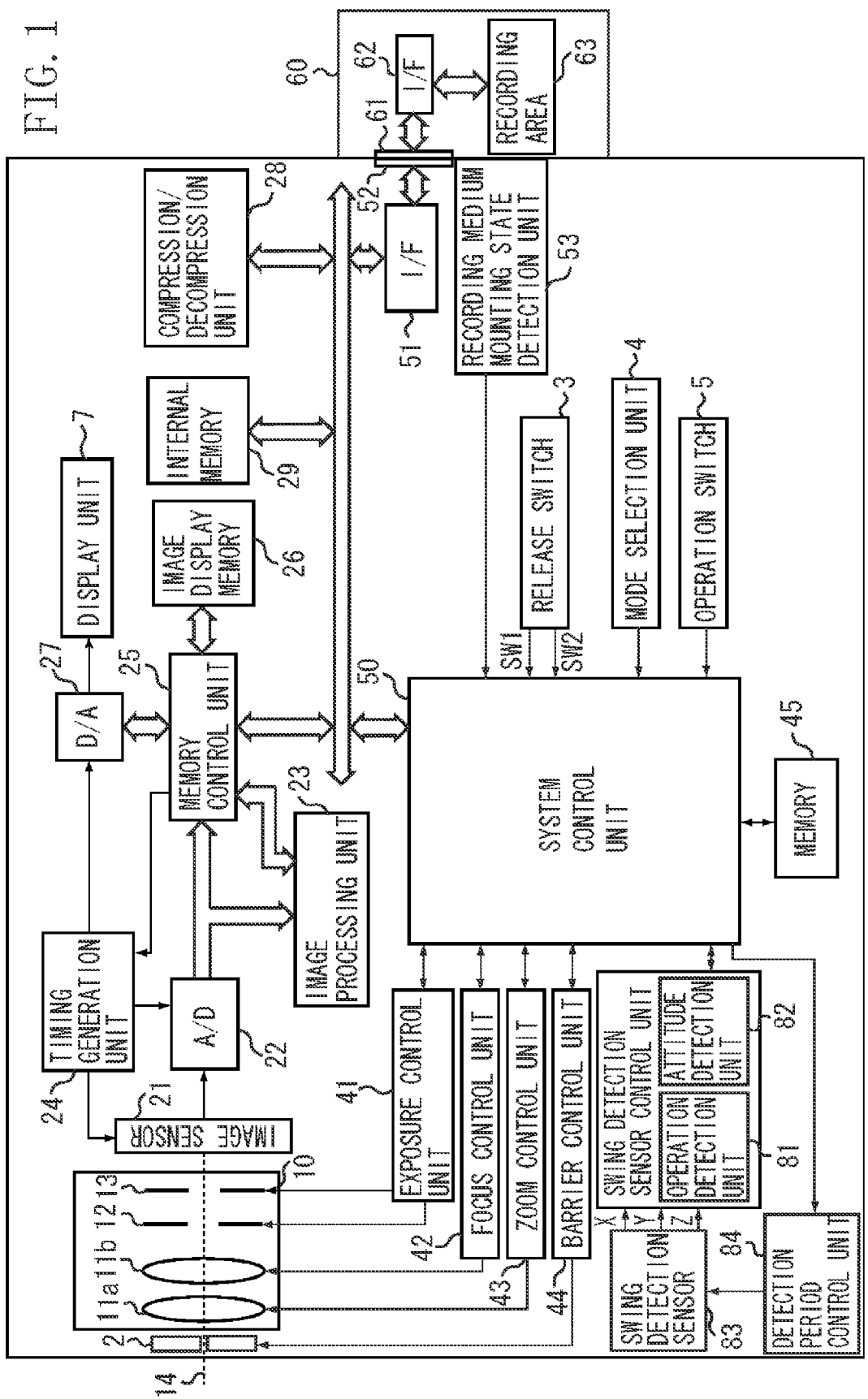

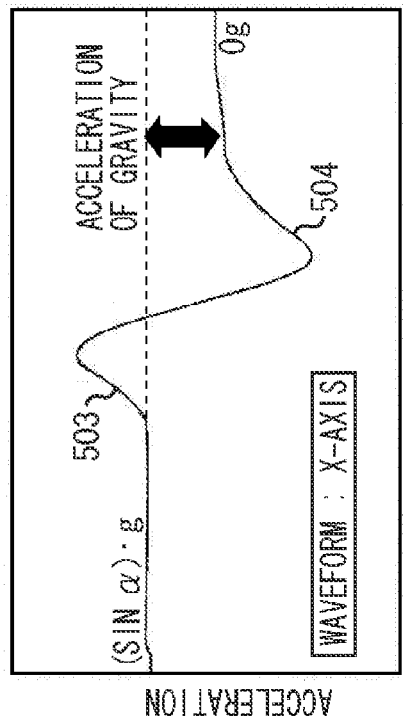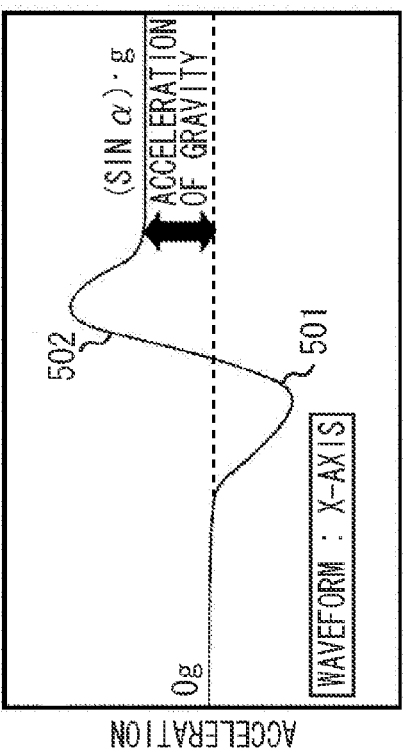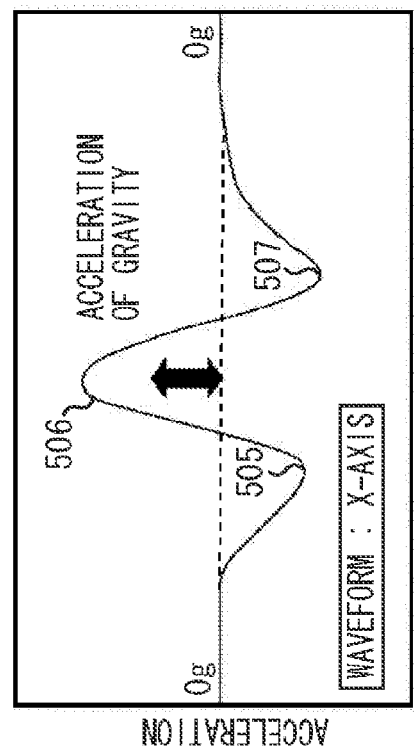

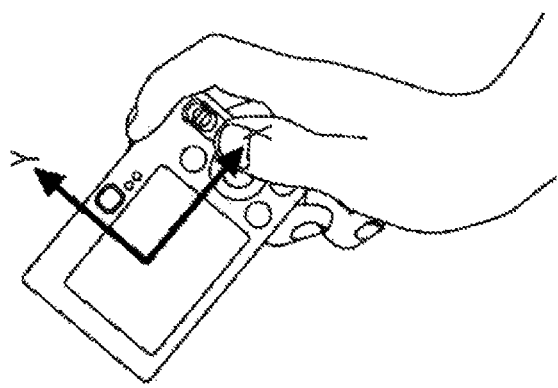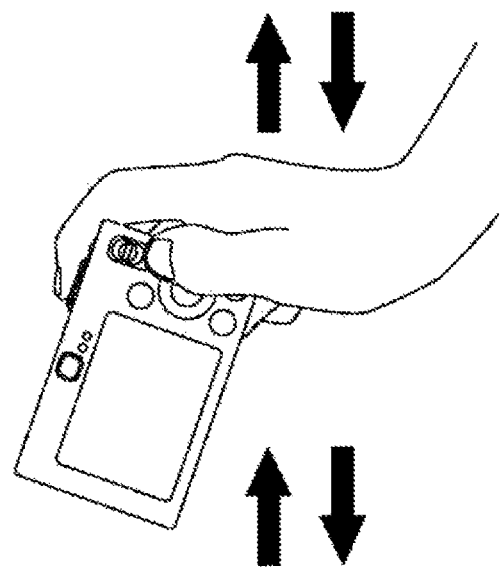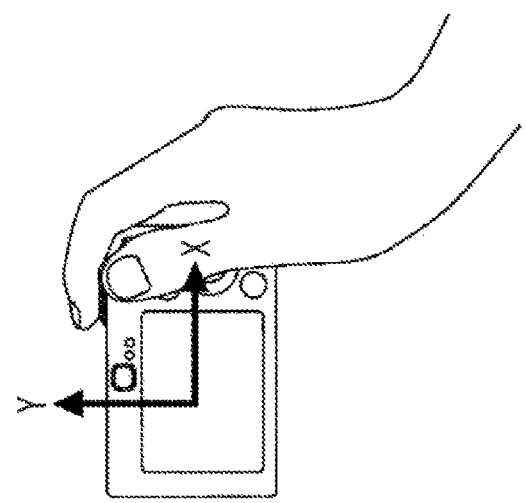

IMAGE PROCESSING APPARATUS AND METHOD

BACKGROUND OF THE INVENTION

1. Field of the Invention

The present invention relates to a method for the operability of an imaging apparatus.

2. Description of the Related Art

A conventional method enables a user to intuitively execute a function of a camera based on a result of detection of acceleration generated by swinging the camera.

FIGS. 15A, B, and C each illustrate a swinging operation for swinging an imaging apparatus (camera) while looking at a display unit of the imaging apparatus. When a user holds a camera, the user basically holds it with one hand (the right hand if he is right-handed) to keep the horizontal attitude of the camera (FIG. 15A), so that the user can easily press the shutter button.

When the user swings the camera, the user swings the camera up and down from the horizontal attitude of the camera around his wrist or elbow. Therefore, when the user swings down the imaging apparatus, the user swings the camera up from the horizontal attitude at first and then he swings it down.

In swinging up the imaging apparatus, the imaging apparatus is swung in a manner illustrated in FIGS. 15A, 15B, and 15C in this order of changing attitudes. On the other hand, in swinging down the imaging apparatus, the attitude of the imaging apparatus is changed in a reversed order.

More specifically, because a user may basically hold a camera in the horizontal camera attitude (FIG. 15A) with his dominant hand, the user, in swinging down the camera (the primary operation), may often swing the camera up (a preparatory operation) before swinging it down (the primary operation). Furthermore, in swinging up the camera (the primary operation), may often swing the camera down (a preparatory operation) before swinging it up (the primary operation) to swing the camera with a sufficient level of swinging force.

Japanese Patent No. 04009887 discusses a method that enables allocation of different camera functions to different camera swinging operations in axial directions of detecting acceleration. More specifically, the method discussed in Japanese Patent No. 04009887 discusses a camera having an acceleration sensor for sensing an acceleration in ±X, ±Y, and ±Z directions and configured to execute an operation correspondingly allocated to each of the axes if it is determined that the level of the acceleration in each axis has exceeded a threshold value.

However, it is difficult for a user to swing a camera precisely in an axial direction for detecting the acceleration because a camera swinging operation may be subjected to an affect from the user's rotational motion around his articulations. Accordingly, an acceleration may often be generated in a direction different from the axial direction for detecting the acceleration. Therefore, if a conventional method is used that determines whether the acceleration have exceeded a threshold value, a swinging operation in a direction different from the primary operation may be detected as the primary operation. Accordingly, the accuracy of detecting the acceleration is low.

Furthermore, in the above-described conventional method, a camera capable of detecting acceleration executes a function allocated to the primary operation if it is determined that the user has executed the intended camera swinging operation after the waveform of a conventional primary operation is detected. Therefore, a time lag may arise between the timing of the swinging operation and the timing of executing the intended function. Principally because of the time lag, in the conventional method, a user cannot intuitively operate the imaging apparatus.

SUMMARY OF THE INVENTION

According to an aspect of the present invention, an apparatus includes an imaging unit configured to output an image signal of a captured image, a display unit configured to display the image signal as an image, a swing detection unit configured to detect a component of acceleration of a swinging operation and output the detected acceleration component as an acceleration signal, an operation detection unit configured to detect the swinging operation by using a control unit based on the output of the swing detection unit, and a control unit configured to change the image to be displayed on the display unit based on the swinging operation detected by the operation detection unit wherein the operation detection unit is configured, if the acceleration signal reaches a first and a second threshold values, which has an opposite sign as a sign of the first threshold value and which is larger than the first threshold value in an absolute value, after it is determined that the acceleration signal has exceeded the first threshold value, to determine that the apparatus has been swung.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 1 illustrates an exemplary system configuration of an imaging apparatus according to an exemplary embodiment of the present invention.

FIGS. 3A, 3B, and 3C are graphs illustrating examples of acceleration waveforms generated by swinging up, down, and up-and-down the imaging apparatus according to an exemplary embodiment of the present invention.

FIGS. 15A through 15C each illustrate an example of a swinging operation.

DESCRIPTION OF THE EMBODIMENTS

Figure 2B:
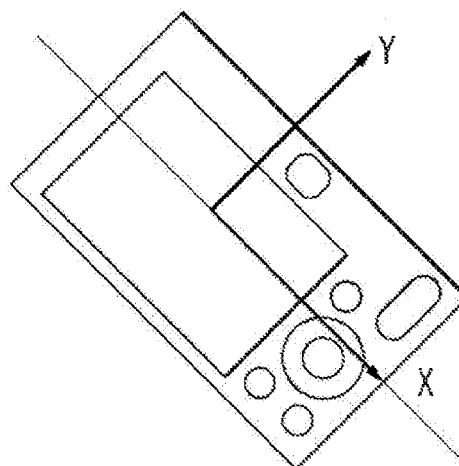
FIGS. 2A, 2B, 2C, and 2D each illustrate change of acceleration of gravity, which arises when the attitude of an imaging apparatus is changed.

Various exemplary embodiments, features, and aspects of the invention will be described in detail below with reference to the drawings.

FIG. 1 illustrates an exemplary system configuration of an imaging apparatus according to an exemplary embodiment of the present invention.

Referring to FIG. 1, an optical system 10 of an imaging apparatus 1 includes a zoom lens unit 11a, a focusing lens unit 11b, a shutter unit 12, and a diaphragm unit 13. An optical axis 14 is an optical axis of the optical system 10. An image sensor 21 converts an optical image into an electric signal. An analog-to-digital (A/D) converter 22 converts an analog output signal of the optical image formed by the image sensor 21 into a digital signal. A timing generation unit 24 supplies a clock signal and a control signal to the image sensor 21, the A/D converter 22, and a digital-to-analog (D/A) converter 27. The timing generation unit 24 operates under control of a memory control unit 25 and a system control unit 50.

An image processing unit 23 executes specific image processing, such as pixel interpolation processing, color conversion processing, and gamma processing on data received from the A/D converter 22 or the memory control unit 25. In addition, the image processing unit 23 executes specific calculation processing by using image data of a captured image. Furthermore, the image processing unit 23 is capable of executing auto white balance (AWB) processing based on a result of the calculation. The calculation processing executed by an exposure control unit 41 will be described in detail later below.

The memory control unit 25 controls the A/D converter 22, the image processing unit 23, the timing generation unit 24, an image display memory 26, the D/A converter 27, a compression/decompression unit 28, and an internal memory 29. Data output from the A/D converter 22 is written on the image display memory 26 or the internal memory 29 via the image processing unit 23 and the memory control unit 25 or is directly written thereon via the memory control unit 25.

A display unit (display) 7 includes a thin film transistor (TFT) display or a liquid crystal display (LCD). Image data stored on the image display memory 26 is displayed on the display unit 7. By serially displaying captured image data on the display unit 7, the display unit 7 can implement an electronic viewfinder. In addition, the display unit 7 can display various menu items of various settings of the imaging apparatus 1. A user of the imaging apparatus 1 can change a setting of a designated setting item by appropriately selecting a menu item, which is displayed on the display unit 7, while operating an operation switch 5.

The compression/decompression unit 28 reads an image from the internal memory 29 and executes compression and decompression on the image data by adaptive discrete cosine transform (ADCT). The internal memory 29 stores captured still images and moving images. More specifically, the internal memory 29 has a storage capacity large enough to store a predetermined number of still images and moving images of a predetermined length of time. In addition, the internal memory 29 also functions as a work area of the system control unit 50.

The exposure control unit 41 controls the shutter unit 12 and the diaphragm unit 13. A focus control unit 42 controls the focusing lens unit 11b. A zoom control unit 43 controls zooming by using the zoom lens 11a. The barrier control unit 44 controls an operation of a barrier 2, which is a protection member disposed in front of the lens.

The system control unit 50 controls the operation of the entire imaging apparatus 1. A storage unit 45 includes a volatile memory and a non-volatile memory such as an electrically erasable programmable ROM (EEPROM), which is capable of electrically recording and erasing data thereon and therefrom. The volatile memory temporarily stores a constant, a variable, and a program, which are used for the operation of the system control unit 50. The non-volatile memory records a constant, a variable, and a program, which are used for the operation of the imaging apparatus 1. The constant, the variable, and the program recorded on the non-volatile memory of the storage unit 45 are not lost even after the imaging apparatus 1 is powered off.

In the present exemplary embodiment, an acceleration sensor is employed as a swing detection sensor 83. The swing detection sensor 83 detects an acceleration component (acceleration) of an operation for swinging the imaging apparatus 1. As the swing detection sensor 83, various sensors can be used. More specifically, a sensor capable of detecting acceleration in the direction of one axis only, in two axes (X and Y axes), or in three axes (X, Y, and Z axes) can be used as the swing detection sensor 83. Furthermore, the above-described sensors can be used in combination to function as the swing detection sensor 83.

A swing detection sensor control unit 80 includes an operation detection unit 81 and an attitude detection unit 82. The swing detection sensor control unit 80 detects a signal output from the swing detection sensor 83 (detects an acceleration signal if acceleration is to be detected). Thus, the swing detection sensor control unit 80 detects an attitude of the imaging apparatus 1. The operation detection unit 81 detects a predetermined vibration applied to the imaging apparatus 1. More specifically, the operation detection unit 81 determines whether the user has intentionally swung the imaging apparatus 1 (or whether the imaging apparatus 1 is in a stationary (non-swung) state).

If it is determined that the imaging apparatus 1 is in a predetermined attitude, then the attitude detection unit 82 disables an operation input via an operation member, such as the operation switch 5, a release switch 3, or a mode selection unit 4, via the system control unit 50. In addition, the system control unit 50 controls a detection period control unit 84 to change a period of detection by the swing detection sensor 83.

The release switch 3, the mode selection unit 4, and the operation switch 5 constitute an operation unit for inputting various operations and instructions to the system control unit 50. The release switch 3, the mode selection unit 4, and the operation switch 5 include a combination of components such as a switch, a dial, a touch panel, and a voice recognition device.

The release switch 3 can be pressed at two different stages. More specifically, the user can give an image taking preparation instruction by half-pressing the release switch 3 (SW1 ON), which is an operation for pressing the release switch 3 to a first stage. Furthermore, the user can give an image taking instruction by fully pressing the release switch 3 (SW2 ON), which is an operation for pressing the release switch 3 to a second stage.

The mode selection unit 4 can be operated by the user to change an operation mode of the imaging apparatus 1, such as a power off mode, an image taking mode, and an image reproduction mode. The operation switch 5 includes various buttons and a touch panel. More specifically, the operation switch 5 includes a menu button, a set button, and a flash set button.

When the user presses a switch SW1 of the release switch 3, the system control unit 50 executes control for starting an image taking preparation operation, such as auto focus (AF) processing or auto exposure (AE) processing. When the user gives an image taking instruction by pressing a switch SW2 of the release switch 3, the system control unit 50 drives the shutter unit 12 and the diaphragm unit 13 via the exposure control unit 41 and executes control for capturing an image of an object by using the image sensor 21.

Furthermore, a signal read from the image sensor 21 is then subjected to exposure processing and image processing by using the A/D converter 22, the image processing unit 23, the compression/decompression unit 28, and the internal memory 29. Thus, image data of the object image is generated. The image data generated in the above-described manner is then recorded, as an image file, on a recording (storage) area 63 of a recording medium 60 via an interface 51 and a connector 52 of the imaging apparatus 1 and via a connector 61 and an interface 62 of the recording medium 60, which is a removable recording medium.

As the recording medium 60, a flash memory can be used. A recording medium mounting state detection unit 53 detects the presence or absence of a recording medium 60 on the imaging apparatus 1.

Now, a method for detecting an operation for swinging the imaging apparatus 1 based on an acceleration waveform, which is an exemplary embodiment of the present invention, will be described below with reference to FIGS. 2A through 2D and FIG. 4.

The imaging apparatus 1 is subjected to acceleration of gravity, which is generated by the gravity of the earth, and an acceleration or deceleration, which is generated due to a motion of the user who holds the imaging apparatus 1. On the earth, an acceleration of gravity of 1 g (i.e., 9.8 m/s$^2$) is applied to an object when the object stays stationary. On the other hand, during a free fall, no acceleration of gravity (i.e., the acceleration of gravity of 0 g) is applied to the object.

Meanwhile, on a moving object, when the direction of movement of the object is defined as a "positive" direction, an acceleration having a positive acceleration component, which is generated at the beginning of the fall (during acceleration), and an acceleration having a negative acceleration component, which is generated at the end of the fall (during deceleration), are applied. In this case, a part of an acceleration waveform corresponding to acceleration timing is curved towards a positive direction while another part thereof corresponding to deceleration timing is curved towards a negative direction. More specifically, the direction of the curve of an acceleration waveform corresponding to the acceleration timing is opposite to the direction of the curve thereof corresponding to the deceleration timing. During uniform motion, no acceleration is applied to the object. Accordingly, the acceleration waveform does not show a curve for timing corresponding to the uniform motion (i.e., 0 g).

An example of an acceleration waveform obtained when the imaging apparatus 1 is swung will be described in detail below.

Figure 2A:
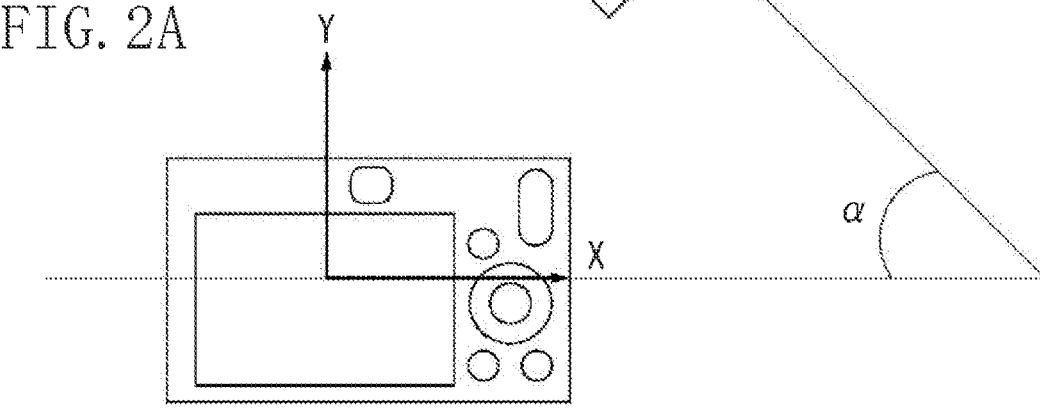
Figure 2C:
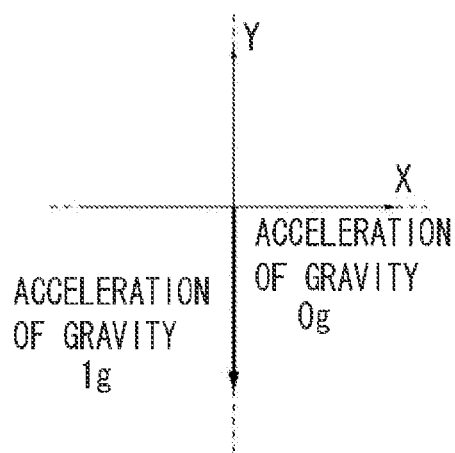
Figure 2D:
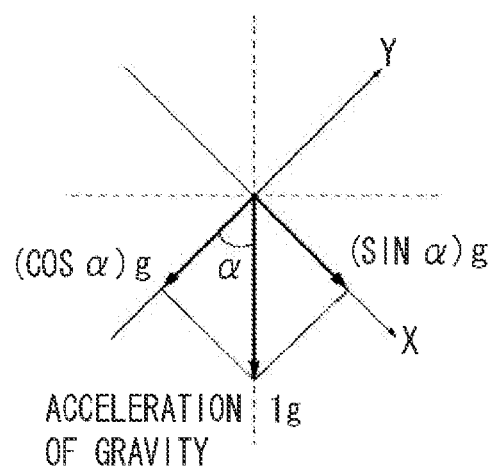

FIG. 2A illustrates a coordinate system corresponding to a state in which the imaging apparatus 1 according to the present exemplary embodiment is in a horizontal attitude as illustrated in FIG. 15A. FIG. 2B illustrates a coordinate system corresponding to a state in which the imaging apparatus 1 is swung up as illustrated in FIG. 15C. FIGS. 2C and 2D each illustrate an acceleration of gravity detected by the swing detection sensor 83, which is configured to detect an acceleration in directions of X- and Y-axes.

In the present exemplary embodiment, the X- and Y-axes of the imaging apparatus 1 are defined as follows. As illustrated in FIG. 2A, the Y-axis corresponds to a vertical direction on a plane normal to an optical axis. The direction on the Y-axis is positive upwards from the center of the display unit 7 in the example illustrated in FIG. 2A. On the other hand, the X-axis corresponds to a direction perpendicular to the Y-axis on the plane normal to the optical axis. The direction on the X-axis is positive to the right of the center of the display unit 7 in the example illustrated in FIG. 2A.

In the present exemplary embodiment, the directions of the axes are taken as described above because of the following reasons. More specifically, an imaging apparatus is usually designed so that a user of the imaging apparatus can operate an operation member such as a shutter button by his right hand. Accordingly, in most cases of swinging an imaging apparatus, the user usually swings the imaging apparatus, which is held in his right hand, up, down, or up-and-down around his right wrist or right elbow. Therefore, if the imaging apparatus is designed so that the user can primarily operate it with his left hand, the same effect as that according to the present exemplary embodiment can be achieved if the positive and the negative directions of the X-axis are reversely taken.

In the example in FIG. 2A, the attitude of the imaging apparatus 1 is in a horizontally stationary state. The imaging apparatus 1 is often put in the horizontally stationary attitude when the user looks at an image displayed on the display unit 7 of the imaging apparatus 1. FIG. 2C illustrates an exemplary acceleration of gravity detected when the imaging apparatus 1 is in the horizontally stationary attitude illustrated in FIG. 2A. In this case, where the imaging apparatus 1 is in the horizontally stationary attitude, the acceleration of gravity is applied only in the direction of the Y-axis while no acceleration of gravity is generated in the direction of the X-axis. Accordingly, in this horizontally stationary attitude, the acceleration of gravity of 0 g level is applied to the imaging apparatus 1 in the direction of the X-axis while the acceleration of gravity of 1 g level is applied thereto in the direction of the Y-axis.

On the other hand, in the example illustrated in FIG. 2B, the imaging apparatus 1 is swung up by an angle of α degrees from the ground (the horizontal line). In this case, when the imaging apparatus 1 is swung up from the horizontal level (0°) to the angle of α degrees as illustrated in FIG. 2D, the acceleration of gravity of (sin α) g level is applied to the imaging apparatus 1 in the X-axis while the acceleration of gravity of (cos α) g level is applied thereto in the Y-axis. Therefore, if the imaging apparatus 1 is in a stationary state, the level of acceleration applied to the imaging apparatus 1 when the imaging apparatus 1 is in a horizontally stationary state is different from the level of acceleration applied to the imaging apparatus 1 when the imaging apparatus 1 comes to the swung-up position.

FIGS. 3A through 3C each illustrate a waveform of a component of an acceleration in the direction of the X-axis, which is detected by the swing detection sensor 83 when the user of the imaging apparatus 1 swings the imaging apparatus 1 up or down. In each of the examples illustrated in FIGS. 3A through 3C, time is taken on the horizontal axis while an acceleration component generated when the user swings the imaging apparatus 1 up from the horizontally stationary state is taken on the vertical axis.

FIG. 3A illustrates a waveform of an acceleration in the direction of the X-axis, which acceleration being generated when the user swings the imaging apparatus 1 up from the horizontally stationary state. More specifically, in this state, the imaging apparatus 1 is accelerated at a timing of start of the swinging operation, then is decelerated at a timing of the end of the swing-up operation, and then is held stationary at the timing of the end of the swing-up operation. The waveform illustrated in FIG. 3A corresponds to the acceleration applied to the imaging apparatus 1 when the attitude of the imaging apparatus 1 is changed from the attitude illustrated in FIG. 15A, then to that illustrated in FIG. 15B, and then to that illustrated in FIG. 15C.

In this case, at a peak 501, the swing detection sensor 83 detects an acceleration during acceleration applied to start the swing-up operation. At a peak 502, the swing detection sensor 83 detects an acceleration during deceleration applied to stop the swing-up operation. With respect to the acceleration of gravity applied to the imaging apparatus 1 during the above-described swing-up operation, the coordinate system corresponding to the swing-up operation has shifted from the state illustrated in FIG. 2A to that illustrated in FIG. 2B. Accordingly, in this case, the component of the acceleration of gravity in the direction of the X-axis during a time period in which the imaging apparatus 1 stays stationary before and after the swinging operation is varied from 0 g level (FIG. 2C) to (sin α) g level (FIG. 2D).

FIG. 3B illustrates a waveform of an acceleration detected by the swing detection sensor 83 in the direction of the X-axis when the user swings and accelerates the imaging apparatus 1 down from the swung-up position, then decelerates and stops the swing-down operation at the position of the horizontal stationary attitude. The waveform illustrated in FIG. 3B corresponds to the acceleration applied to the imaging apparatus 1 when the attitude of the imaging apparatus 1 is changed from the attitude illustrated in FIG. 15C, then to that illustrated in FIG. 15B, and then to that illustrated in FIG. 15A.

In this case, at a peak 503, the swing detection sensor 83 detects an acceleration during acceleration applied to start the swing-down operation. At a peak 504, the swing detection sensor 83 detects an acceleration during deceleration applied to stop the swing-down operation. With respect to the acceleration of gravity applied to the imaging apparatus 1 during the above-described swing-down operation, the coordinate system corresponding to the swing-down operation has shifted from the state illustrated in FIG. 2B from that illustrated in FIG. 2A. Accordingly, in this case, the component of the acceleration of gravity in the direction of the X-axis during a time period in which the imaging apparatus 1 stays stationary before and after the swinging operation is varied from the (sin α) g level (FIG. 2D) to the 0 g level (FIG. 2C).

When the user actually swings the imaging apparatus 1 down after swinging up the imaging apparatus 1, a waveform of acceleration of gravity illustrated in FIG. 3C is obtained, which is similar to a combination of the waveforms of acceleration illustrated in FIGS. 3A and 3B.

Referring to FIG. 3C, a peak 505 is a peak of an acceleration that appears due to acceleration generated when the user has finished a swing-up operation. A peak 506 is a peak of an acceleration that appears due to a combination of a deceleration generated when the swing-up operation is finished, and an acceleration generated when a swing-down operation is started. A peak 507 is a peak of an acceleration that appears due to deceleration generated when the user has finished the swing-down operation. In the present exemplary embodiment, the peak 505 is referred to as a "first acceleration waveform". The peak 506 is referred to as a "second acceleration waveform. The peak 507 is referred to as a "third acceleration waveform".

The peak 506 includes an influence of the acceleration of gravity. Therefore, the magnitude of the peak 506 becomes greater because the acceleration of gravity is added to the acceleration. Accordingly, the peak 506 can be effectively utilized in detecting an operation for swinging the imaging apparatus 1 with an acceleration. In the example illustrated in FIG. 3C, an acceleration waveform of an operation for swinging the imaging apparatus 1 up first and then swinging it down is illustrated. If the user swings the imaging apparatus 1 down first and then swings it up, the corresponding waveform has a phase reverse to that of the waveform illustrated in FIG. 3C. In this case, the output in the horizontally stationary state is (sin α) g level.

Figure 4:
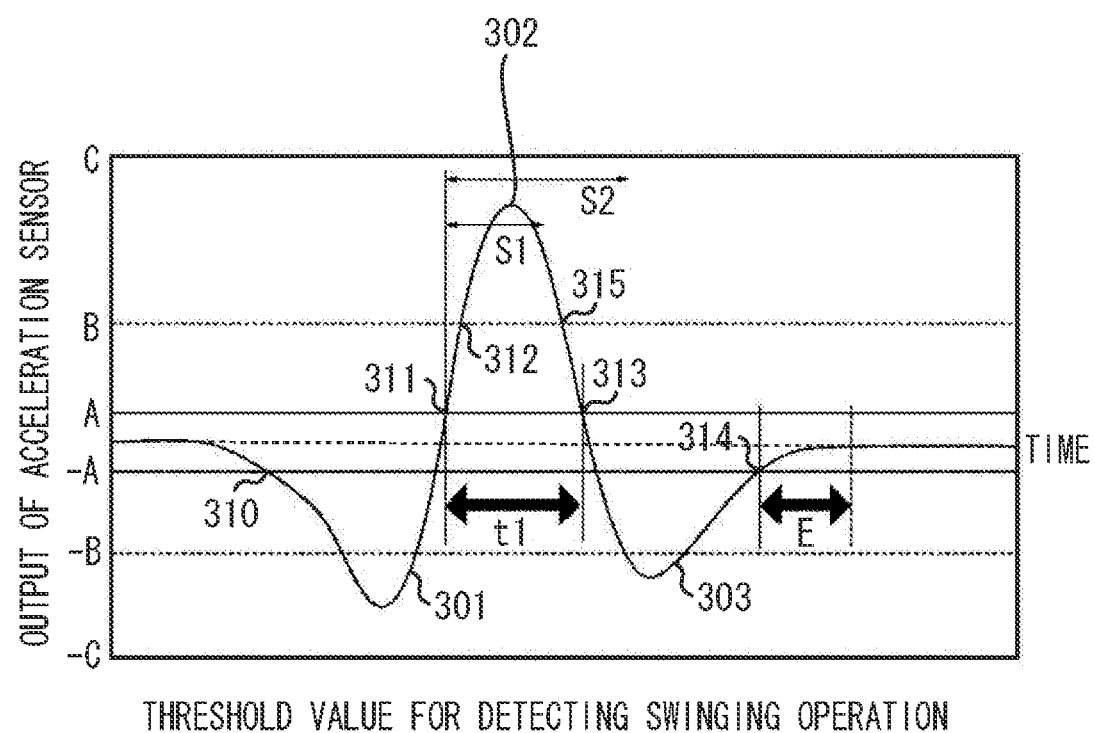
FIG. 4 is a graph illustrating an example of an acceleration waveform generated when the imaging apparatus according to an exemplary embodiment of the present invention is swung.

FIG. 4 illustrates an example of a component of acceleration in the direction of the X-axis, which is detected by an acceleration detection device (in the present exemplary embodiment, the swing detection sensor 83) when the user has actually swung the imaging apparatus 1 down as illustrated in FIG. 3C. In the example illustrated in FIG. 4, time is taken on the horizontal axis while an output of the swing detection sensor 83 is taken on the vertical axis. Signs "+" and "−" indicate the direction of acceleration.

In the example illustrated in FIG. 4, threshold values "A" and "−A" are used for determining whether the imaging apparatus 1 according to the present exemplary embodiment is in motion. When the imaging apparatus 1 is in the horizontally stationary attitude, no X-axis component of acceleration is detected as illustrated in FIG. 2C (i.e., the level of acceleration of gravity is 0 g). Therefore, if the level of the detected acceleration is greater than the threshold value −A or smaller than the threshold value A, then it is determined that the imaging apparatus 1 is not in motion. On the other hand, if the level of the detected acceleration is equal to or smaller than the threshold value −A or equal to or greater than the threshold value A, then it is determined that the imaging apparatus 1 is in motion.

On the other hand, threshold values "B" and "−B" are used for determining whether the imaging apparatus 1 has been swung in a predetermined swinging operation. Accordingly, in the present exemplary embodiment, the threshold values A, −A, B, and −B have the following relationship:

Threshold value −B<threshold value −A
Threshold value A<threshold value B.

Therefore, if the level of acceleration equal to or greater than the threshold value A and smaller than the threshold value B is detected, or if the level of acceleration equal to or smaller than the threshold value −A and greater than the threshold value −B is detected, then it is determined that the imaging apparatus 1 is in motion but the imaging apparatus 1 has not been swung in a predetermined swinging operation. On the other hand, if the level of acceleration equal to or greater than the threshold value B, or equal to or smaller than the threshold value −B, then it is determined that the imaging apparatus 1 is in motion and the imaging apparatus 1 has been swung in a predetermined swinging operation.

Threshold values "C" and "−C" are used for determining whether the imaging apparatus 1 has been swung with a swinging intensity within a predetermined range of intensity. Therefore, in the present exemplary embodiment, the threshold values B, −B, C, and −C have the following relationship:

Threshold value −C<threshold value −B
Threshold value B<threshold value C.

Accordingly, if the level of acceleration equal to or greater than the threshold value B and smaller than the threshold value C is detected or if the level of acceleration equal to or smaller than the threshold value −B and greater than the threshold value −C is detected, then it is determined that the imaging apparatus 1 has been swung with the predetermined intensity (in the predetermined swinging operation).

On the other hand, if the level of acceleration equal to or greater than the threshold value C, or equal to or smaller than the threshold value −C is detected, then it is determined that the user has swung the imaging apparatus 1 too strong. If the imaging apparatus 1 is swung with a too high intensity, it is likely that the imaging apparatus 1 is thrown out of the user's hand and falls onto the ground. Accordingly, if it is determined that the user has swung the imaging apparatus 1 too strong, then a warning is given to the user. The warning can be executed by displaying a warning message on the display unit 7 or by issuing an alarm sound from a speaker (not illustrated).

Among peaks 301 through 303 illustrated in FIG. 4, the peak (waveform) 302, whose absolute value of acceleration level is the greatest of those of the peaks 301 through 303, corresponds to the second acceleration waveform illustrated in FIG. 3C. If the user intends to swing the imaging apparatus 1 down, the peak 302 (i.e., the second acceleration waveform) corresponds to the swing-down operation. On the other hand, if the user intends to swing the imaging apparatus 1 up, the peak 302 (i.e., the second acceleration waveform) corresponds to the swing-up operation.

In this case, the waveform 301 corresponds to the first acceleration waveform illustrated in FIG. 3c, which is the waveform of the acceleration generated by a swing-up operation that is a preparatory operation for preparing for a subsequent swing-down operation (the primary operation). The peak 303 corresponds to the third acceleration waveform illustrated in FIG. 3C. The peak 303 is a waveform that appears when deceleration during a swing-down operation is detected. If the user has performed a swing-up operation as the primary operation, then a waveform that is an axisymmetric conversion of the waveform illustrated in FIG. 4 across the X-axis (the signs of the values are reversed) is obtained. In this case, the waveforms 301 and 303 are curved upwards.

The waveform whose absolute value of the level of acceleration is the greatest does not necessarily correspond to a primary operation. It can be merely discussed here that the intensity of a primary operation is likely to be higher than that of a preparatory operation. A method for detecting a waveform of a primary operation according to the present exemplary embodiment will be described in detail later below.

A plot 310 indicates a point at which the waveform 301 reaches the threshold value A or the threshold value −A. A plot 311 indicates a point at which the waveform 302 reaches the threshold value A or the threshold value −A. A plot 313 indicates a point at which the waveform 302 reaches the threshold value A or the threshold value −A again. A plot 312 indicates a point at which the waveform 302 reaches the threshold value B or the threshold value −B. A plot 315 indicates a point at which the waveform 3023 reaches the threshold value B or the threshold value −B again. A plot 314 indicates a point at which the waveform 303 reaches the threshold value A or the threshold value −A again.

Threshold values S1 and S2 are threshold values of time t1, when the second acceleration waveform (corresponding to the primary operation) is equal to or greater than the threshold value A, or equal to or smaller than the threshold value −A. More specifically, the time t1 is a time period from a timing at which the waveform 302 exceeds the threshold value A (the plot 311 in FIG. 4) to a timing at which the waveform 302 goes below the threshold value A again (the plot 313 in FIG. 4) (or a time period from a timing at which the waveform 302 goes below the threshold value −A to a timing at which the waveform 302 exceeds the threshold value −A again). In the present exemplary embodiment, it is determined that the second acceleration waveform (corresponding to the primary operation) is detected if the following condition is satisfied.

Threshold value S1≤time t1≤threshold value S2.

If it is determined that the state in which the imaging apparatus 1 is not in motion (i.e., if the acceleration is greater than the threshold value −A and smaller than the threshold value A) has been continued for a time period equal to or longer than a time indicated by a threshold value E, then it is determined that the imaging apparatus 1 is not currently swung. On the other hand, if it is determined that the state, in which the imaging apparatus 1 is not in motion (i.e., if the acceleration is greater than the threshold value −A and smaller than the threshold value A) has not been continued for a time period equal to or longer than a time indicated by a threshold value E, then it is determined that one swinging operation has continued since a timing at which the level of acceleration first exceeded the threshold value A or the threshold value −A.

Therefore, the waveform 303 illustrated in FIG. 4 is regarded as corresponding to one continuous operation to which the waveforms 301 and 302 correspond. If it is determined that an acceleration whose level is greater than the threshold value −A and smaller than the threshold value A is detected and continued for a time period longer than threshold E from the point 314 and if the level of acceleration has decreased to the level equal to or smaller than the threshold value −A, or equal to or greater than the threshold value A again, the present exemplary embodiment starts detection of a next swinging operation.

In the example illustrated in FIG. 4, six threshold values, namely, three threshold values A, B, and C and three reverse-sign threshold values −A, −B, and −C, are used as the threshold values of the acceleration level. However, the present exemplary embodiment is not limited to this. More specifically, it is also useful if six mutually different values other than those described above are used.

Now, a method for detecting a direction of swinging the imaging apparatus 1 by using the above-described characteristics of the present invention will be described in detail below with reference to FIG. 4, which illustrate the waveform corresponding to an output of acceleration generated when the user swings the imaging apparatus 1, and flow charts of FIGS. 5 through 8.

Figure 5:
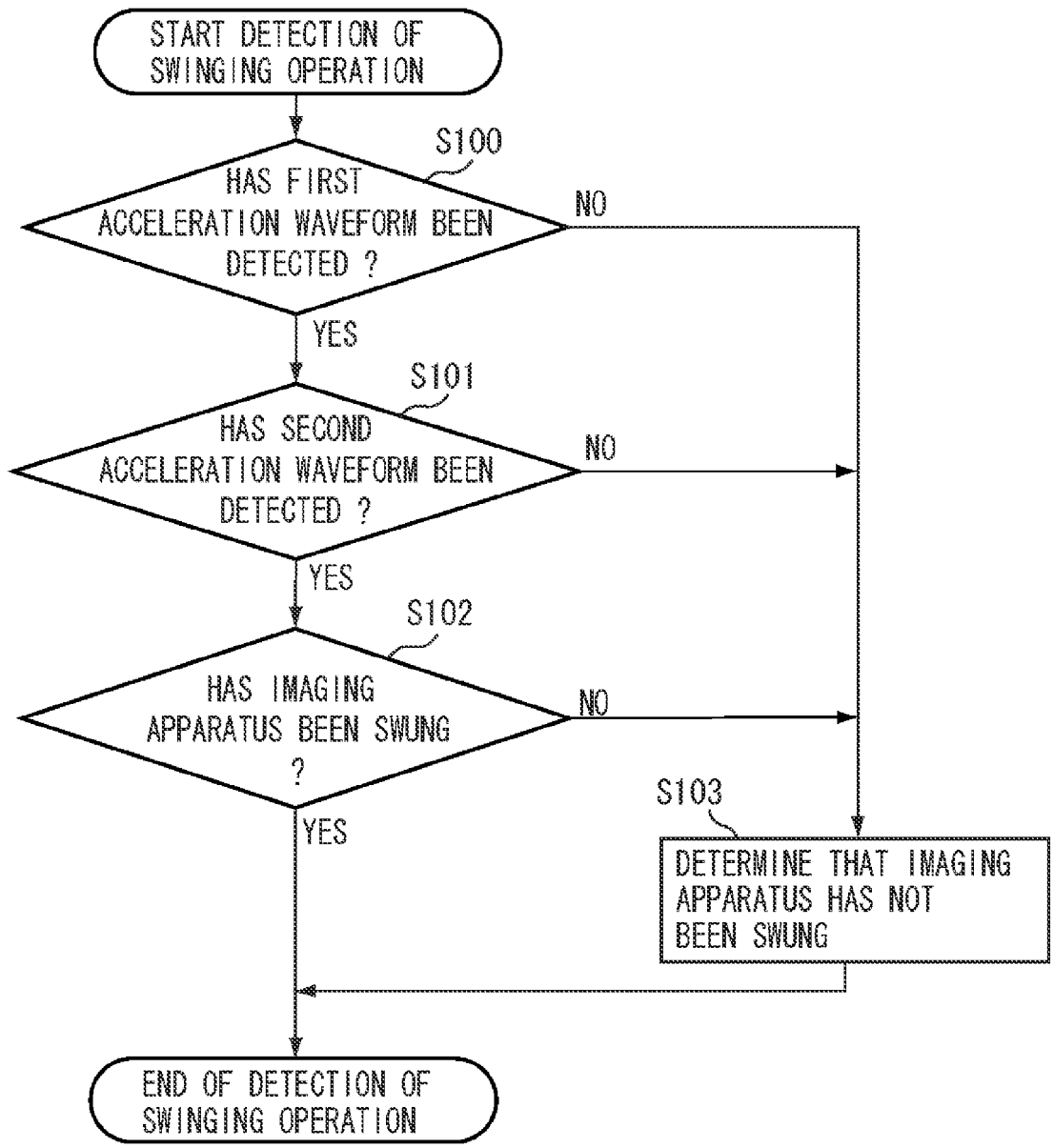
FIG. 5 is a flow chart illustrating an example of swinging operation detection processing executed by the imaging apparatus according to first through third exemplary embodiments of the present invention.

FIG. 5 is a flow chart illustrating an example of processing executed by the operation detection unit 81 for detecting an operation for swinging the imaging apparatus 1. Hereinbelow, processing for detecting an operation for swinging the imaging apparatus 1 will be described in detail below with reference to the waveform illustrated in FIG. 4.

When the acceleration level exceeds the threshold value A or the threshold value −A illustrated in FIG. 4 (the plot 310 in FIG. 4), the operation detection unit 81 starts processing for detecting an operation for swinging the imaging apparatus 1. When the processing for detecting an operation for swinging the imaging apparatus 1 starts, in step S100 (in FIG. 5), the operation detection unit 81 detects a first acceleration waveform.

If it is detected that the first acceleration waveform has exceeded the threshold value A or the threshold value −A, then it is determined that the first acceleration waveform has been detected (Yes in step S100). The operation in step S100 will be described in detail below with reference to FIG. 6.

If it is determined that the first acceleration waveform has been detected (Yes in step S100), then the processing advances to step S101. In step S101, the operation detection unit 81 executes processing for detecting a second acceleration waveform. When the acceleration level exceeds the threshold value B or the threshold value −B (the plot 312 (FIG. 4)), then it is determined that the second acceleration waveform has been detected (Yes in step S101). The operation in step S101 will be described in detail below with reference to FIG. 7.

If it is determined that the first acceleration waveform has been detected (Yes in step S100) and that the second acceleration waveform has been detected (Yes in step S101), then the processing advances to step S102. In step S102, the operation detection unit 81 determines whether the imaging apparatus 1 has been swung and which direction (upwards or downwards) the imaging apparatus 1 has been swung. As will be described in detail later below, the threshold value used in detecting the second acceleration waveform has a sign opposite to the sign of the threshold value used in detecting the first acceleration waveform.

More specifically, if the first acceleration waveform is detected at a timing at which the acceleration level exceeds the threshold value −B, the detection of the second acceleration waveform is executed at a timing the acceleration level exceeds the threshold value B. This is because the detected acceleration waveform corresponds to a preparatory operation of the primary operation. More specifically, in a preparatory operation, the imaging apparatus 1 is swung in a direction reverse to the direction of swinging the imaging apparatus 1 in the primary operation. The operation in step S102 will be described in detail below with reference to FIG. 8.

If it is determined that the imaging apparatus 1 has been swung (Yes in step S102), then the processing for detecting a swinging operation ends. On the other hand, if it is determined that the first acceleration waveform has not been detected (No in step S100), that the second acceleration waveform has not been detected (No in step S101), or that the imaging apparatus 1 has not been swung (No in step S102), then the processing advances to step S103. In step S103, the operation detection unit 81 determines that no swinging operation has been detected and immediately ends the swinging operation detection processing.

Now, the method for detecting the first acceleration waveform (the processing in step S100 in FIG. 5) will be described in detail below with reference to the waveform corresponding to the swinging operation illustrated in FIG. 4 and a flow chart in FIG. 6, which illustrates an exemplary flow of processing for detecting the first acceleration waveform.

Figure 6:
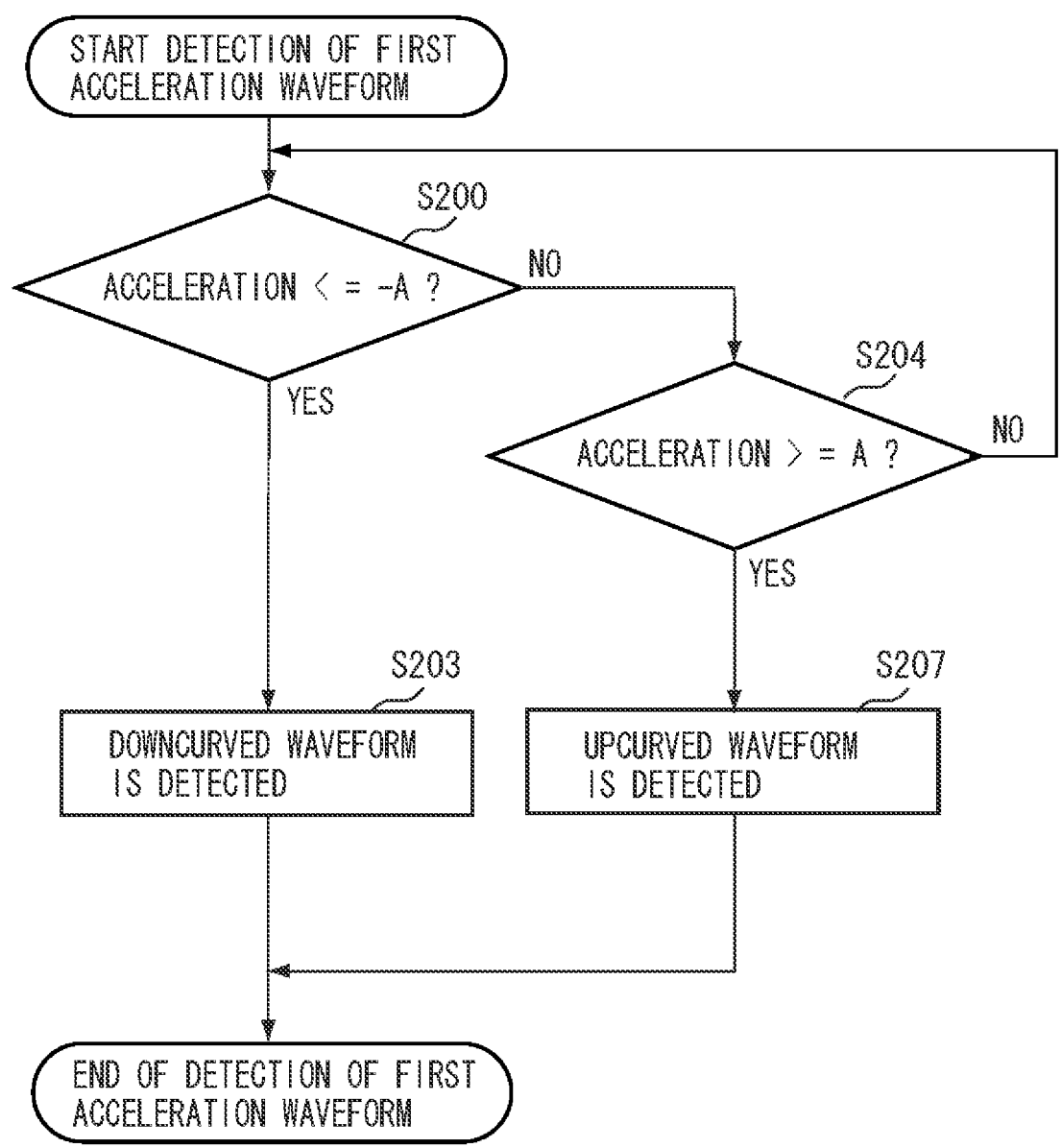
FIG. 6 is a flow chart illustrating an example of processing executed in step S100 illustrated in FIG. 5 by the imaging apparatus according to the first exemplary embodiment of the present invention.

Referring to FIG. 6, in step S200, the operation detection unit 81 determines whether the level of acceleration has decreased to a level below the threshold value −A. If it is determined that the level of acceleration has decreased to a level below the threshold value −A (Yes in step S200), then the processing advances to step S203. In step S203, the operation detection unit 81 detects the first acceleration waveform as a downcurved waveform. Then, the processing for detecting a first acceleration waveform ends.

On the other hand, if it is determined that the level of acceleration has increased to a level above the threshold value −A (No in step S200), then the processing advances to step S204. In step S204, the operation detection unit 81 determines whether the level of acceleration has become equal to or greater than the threshold value A. If it is determined that the level of acceleration has become equal to or greater than the threshold value A (Yes in step S204), then the processing advances to step S207. In step S207, the operation detection unit 81 detects the first acceleration waveform as an upcurve waveform. Then, the processing for detecting a first acceleration waveform ends.

On the other hand, if it is determined that the level of acceleration is below the threshold value A (No in step S204), then, the processing returns to step S200 because in this case, the level of acceleration is determined greater than the threshold value −A and thus the acceleration waveform has not exceeded the threshold value, which means that the imaging apparatus 1 is in the stationary state.

Now, the processing for detecting a second acceleration waveform (the processing in step S101 in FIG. 5) according to the present exemplary embodiment will be described in detail below with reference to the exemplary waveform corresponding to the swinging operation illustrated in FIG. 4 and a flow chart in FIG. 7, which illustrates an exemplary flow of processing for detecting the second acceleration waveform.

After the first acceleration waveform is detected in step S100 (FIG. 5), in step S300 (FIG. 7), the operation detection unit 81 determines whether the level of acceleration has increased to a level equal to or greater than the threshold value A. If it is determined that the level of acceleration has increased to the level equal to or greater than the threshold value A (Yes in step S300), then the processing advances to step S301. In step S301, the operation detection unit 81 detects a peak value (maximum value) during a time period when the level of acceleration is equal to or greater than the threshold value A. The acceleration level is detected based on a detection period of the swing detection sensor 83, which is controlled by the detection period control unit 84. Accordingly, the peak value (maximum value) of the waveform detected after exceeding the threshold value A can be measured by overwriting the peak value (maximum value) when the peak value (maximum value) after exceeding the threshold value A is updated.

If it is determined that the peak value (maximum value) of the waveform has exceeded the threshold value B (Yes in step S301), then the processing advances to step S304. In step S304, the operation detection unit 81 detects the second acceleration waveform as an upcurve waveform. Then, the processing illustrated in FIG. 7 ends.

On the other hand, if it is determined that the peak value (maximum value) of the waveform is smaller than the threshold value B and that the level of acceleration has decreased to a level below the threshold value A without exceeding the threshold value B (No in step S301), then the processing advances to step S310. In step S310, the operation detection unit 81 determines that no second acceleration waveform has been detected. In this case, the processing advances to step S103 (FIG. 5) and then the processing for detecting an acceleration waveform immediately ends.

After the first acceleration waveform is detected in step S100 (FIG. 5), in step S300 (FIG. 7), the operation detection unit 81 determines whether the level of acceleration has increased to a level equal to or greater than the threshold value A. If it is determined that the level of acceleration is below the threshold value A (No in step S300), then the processing advances to step S305. In step S305, the operation detection unit 81 determines whether the level of acceleration has decreased to a level equal to or smaller than the threshold value −A. If it is determined that the level of acceleration has decreased to a level equal to or smaller than the threshold value −A (Yes in step S305), then the processing advances to step S306. In step S306, the operation detection unit 81 determines whether a peak value (minimum value) during a time period, in which the level of acceleration is equal to or smaller than the threshold value −A, is equal to or smaller than the threshold value −B. If it is determined that the peak value (minimum value) during the time period, in which the level of acceleration is equal to or smaller than the threshold value −A, has become equal to or smaller than the threshold value −B before exceeding the threshold value −A again (Yes in step S306), then the processing advances to step S309. In step S309, the operation detection unit 81 detects the second acceleration waveform as a downcurved waveform. Then, the processing illustrated in FIG. 7 ends.

On the other hand, if it is determined that the peak value of the waveform is greater than the threshold value −B and that the acceleration level has exceeded the threshold value −A without decreasing to a level below the threshold value −B (No in step S306), then the processing advances to step S310. In step S310, the operation detection unit 81 determines that no second acceleration waveform has been detected. In this case, the processing advances to step S103 (FIG. 5). Then, the acceleration waveform detection processing immediately ends there.

Now, the processing for determining whether the imaging apparatus 1 has been swung (step S102 in FIG. 5) according to the present exemplary embodiment will be described in detail below with reference to the example of a waveform corresponding to the swinging operation illustrated in FIG. 4 and a flow chart of processing for detecting a second acceleration waveform illustrated in FIG. 8.

Figure 8:
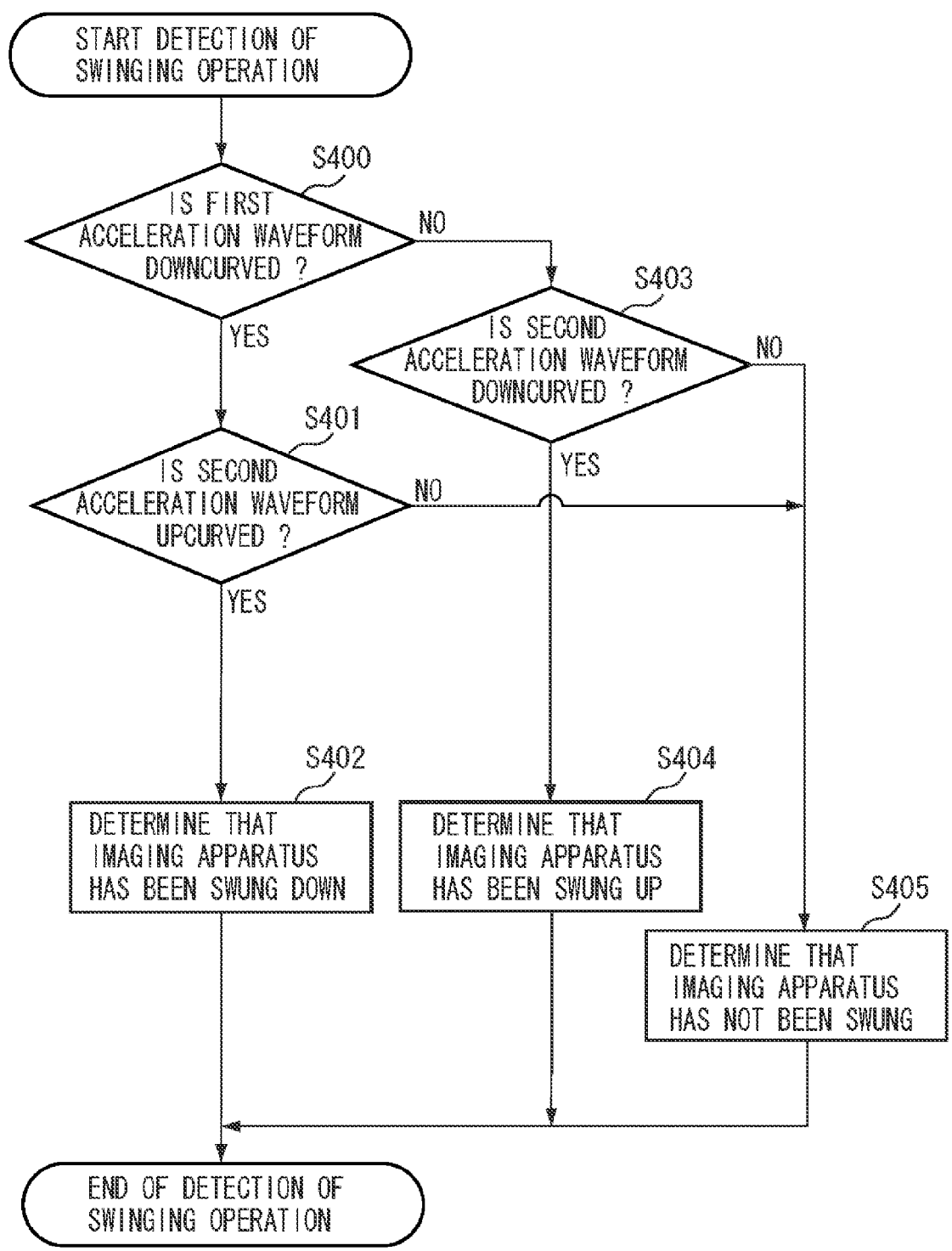
FIG. 8 is a flow chart illustrating an example of processing executed in step S102 illustrated in FIG. 5 by the imaging apparatus according to the first exemplary embodiment of the present invention.

Referring to FIG. 8, in step S400, the operation detection unit 81 determines whether it has been determined in step S203 (FIG. 6) that the waveform of the first acceleration is a downcurved waveform. If it is determined that the waveform of the first acceleration detected in step S203 is a downcurved waveform (Yes in step S400), then the processing advances to step S401.

On the other hand, if it is determined that the waveform of the first acceleration detected in step S203 is not a downcurved waveform (i.e., if the waveform of the first acceleration having an upcurve waveform is detected in step S207 (FIG. 6)) (No in step S400), then the processing advances to step S403.

Figure 7:
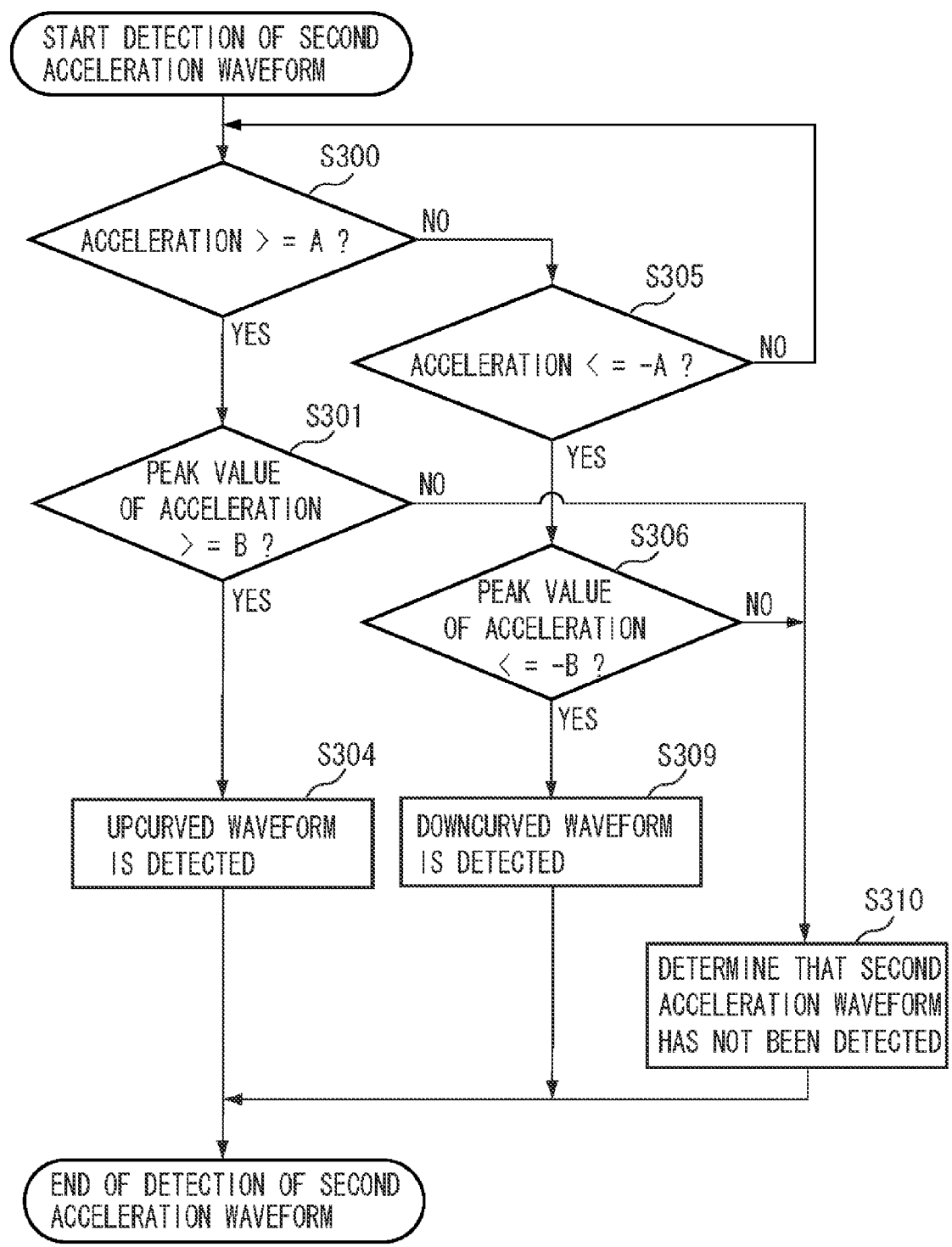
FIG. 7 is a flow chart illustrating an example of processing executed in step S101 illustrated in FIG. 5 by the imaging apparatus according to the first exemplary embodiment of the present invention.

In step S401, the operation detection unit 81 determines whether the second acceleration waveform having an upward curve has been detected in step S304 (FIG. 7). If it is determined that the second acceleration waveform having an upward curve has been detected in step S304 (FIG. 7) (Yes in step S401), then the processing advances to step S402. In step S402, the operation detection unit 81 determines that the imaging apparatus 1 has been swung down.

On the other hand, if it is determined that the second acceleration waveform having an upward curve has not been detected in step S304 (FIG. 7) (No in step S401), then the processing advances to step S405. In step S405, the operation detection unit 81 determines that no swinging operation has been detected. In this case, the processing advances to step S103 (FIG. 5). Then, the acceleration waveform detection processing ends there.

In step S403, the operation detection unit 81 determines whether a second acceleration waveform having a downcurve has been detected in step S309 (FIG. 7). If it is determined that a second acceleration waveform having a downcurve has been detected in step S309 (FIG. 7) (Yes in step S403), then the processing advances to step S404. In step S404, the operation detection unit 81 determines that the imaging apparatus 1 has been swung.

On the other hand, if it is determined that a second acceleration waveform having a downcurve has not been detected in step S309 (FIG. 7) (No in step S403), then the processing advances to step S405. In step S405, the operation detection unit 81 determines that no swinging operation has been detected. In this case, the processing advances to step S103 (FIG. 5). Then, the acceleration waveform detection processing ends there.

In a second exemplary embodiment of the present invention, if a user operates a mobile apparatus such as an imaging apparatus by swinging it and if the user has swung the imaging apparatus 1 with a swinging intensity higher than a predetermined intensity, then a warning is issued to the user (operator), which indicates that the swinging intensity is too high.

In the present exemplary embodiment, an imaging apparatus having a configuration similar to that of the first exemplary embodiment described above will be used to describe the present exemplary embodiment. FIG. 5 is a flow chart illustrating an example of processing executed by the operation detection unit 81 for detecting an operation for swinging the imaging apparatus 1. Hereinbelow, the processing for detecting an operation for swinging the imaging apparatus 1 will be described in detail with reference to the waveform illustrated in FIG. 4. In the present exemplary embodiment, the configuration different from that of the first exemplary embodiment only will be described in detail.

Processing for detecting a first acceleration waveform (step S100 in FIG. 5) according to the present exemplary embodiment will be described in detail below with reference to FIG. 9. Processing for detecting a first acceleration waveform (step S101 in FIG. 5) according to the present exemplary embodiment will be described in detail below with reference to FIG. 10. On the other hand, processing in step S102 in FIG. 5 according to the present exemplary embodiment is similar to that of the first exemplary embodiment. Accordingly, the description thereof will not be repeated here.

Now, the processing for detecting a first acceleration waveform (processing in step S100 in FIG. 5) according to the present exemplary embodiment will be described in detail below with reference to the example of a waveform corresponding to a swinging operation illustrated in FIG. 4 and a flow chart of FIG. 9, which illustrates an example of processing for detecting a first acceleration waveform. In the present exemplary embodiment, processing similar to that in steps of the flow chart of FIG. 6 will not be described in detail again.

Figure 9:
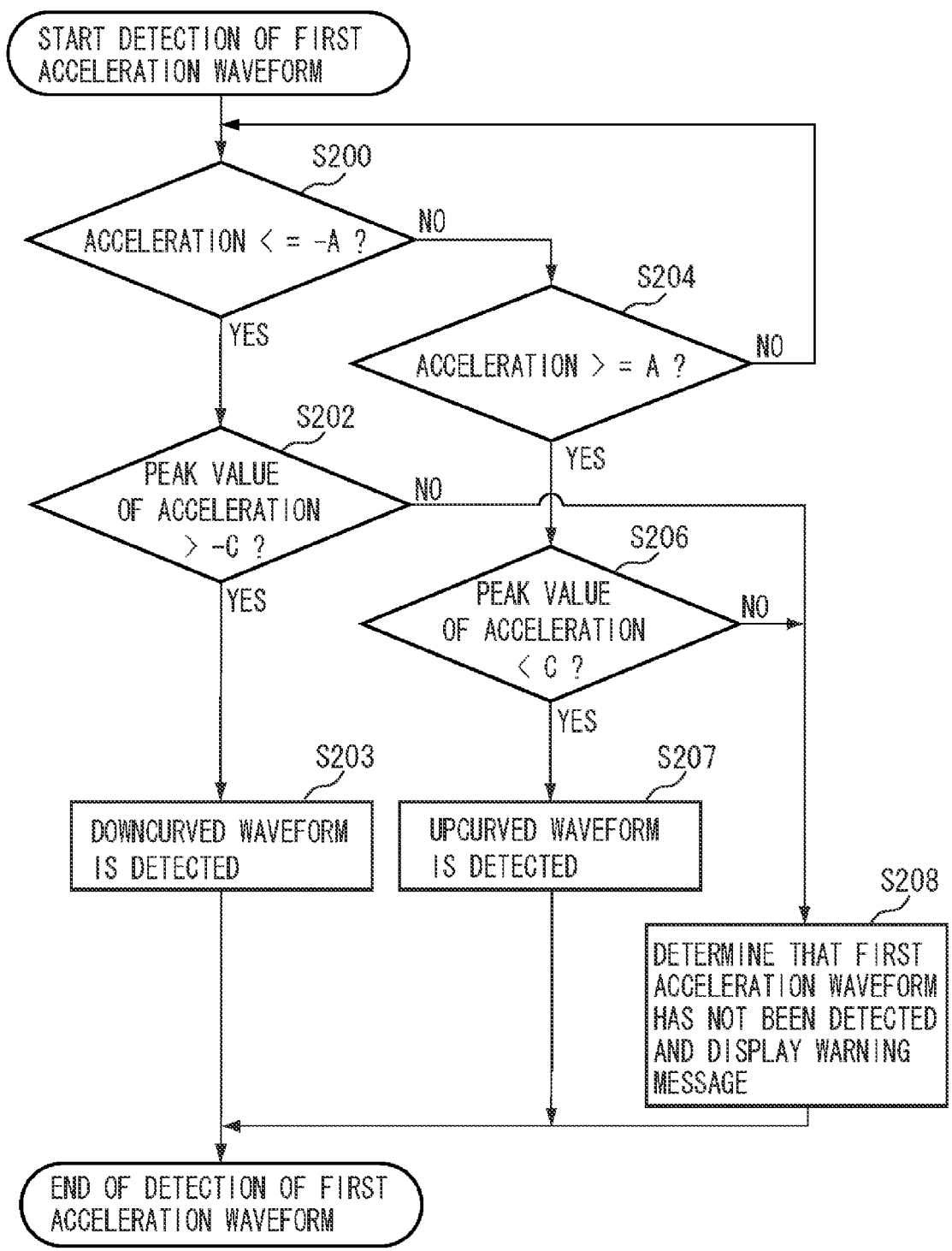
FIG. 9 is a flow chart illustrating an example of processing executed in step S100 illustrated in FIG. 5 by the imaging apparatus according to the second exemplary embodiment of the present invention.

Referring to FIG. 9, if it is determined that the level of acceleration has decreased to a level equal to or smaller than the threshold value −A (Yes in step S200), then the processing advances to step S202. In step S202, the operation detection unit 81 determines whether a peak value (minimum value) of acceleration has decreased to a level greater than the threshold value −C. If it is determined that the peak value of acceleration is greater than the threshold value −C (YES in step S202), then the processing advances to step S203. In this case, in step S203, a first acceleration waveform having a downcurve is detected. Then, the processing for detecting a first acceleration waveform ends.

On the other hand, if it is determined that the peak value (minimum value) of acceleration has decreased to a level smaller than or equal to the threshold value −C (NO in step S202), then the processing advances to step S208. In step S208, the operation detection unit 81 determines that no first acceleration waveform has been detected and displays a warning message on the display unit 7, which indicates that the imaging apparatus 1 has been swung with an extremely high swinging intensity. It is also useful if the warning is executed by issuing an alarm sound from a speaker (not illustrated). Then, the processing advances to step S103 (FIG. 5), which is a step after it is determined "No" in step S100 (FIG. 5).

If it is determined that the level of acceleration has exceeded the threshold value A (Yes in step S204), then the processing advances to step S206. In step S206, the operation detection unit 81 determines whether a peak value (maximum value) of acceleration is smaller than the threshold value C. If it is determined that the peak value of acceleration is smaller than the threshold value C (Yes in step S206), then the processing advances to step S207. In step S207, the operation detection unit 81 detects the first acceleration waveform that is an upcurve waveform. Then, the processing illustrated in FIG. 9 ends. On the other hand, if it is determined that the peak value (maximum value) of acceleration is equal to or greater than the threshold value C (No in step S206), then the processing advances to step S208. In step S208, the operation detection unit 81 determines that no first acceleration waveform has been detected. In this case, the processing advances to step S103 (FIG. 5), which is a step executed If it is determined "No" in step S100.

Now, the processing for detecting a second acceleration waveform (the processing in step S101 in FIG. 5) according to the present exemplary embodiment will be described in detail below with reference to the exemplary waveform corresponding to the swinging operation illustrated in FIG. 4 and a flowchart in FIG. 10, which illustrates an exemplary flow of processing for detecting the second acceleration waveform. In the present exemplary embodiment, processing performed in steps similar to that described above with reference to FIG. 7 will not be described in detail again.

Figure 10:
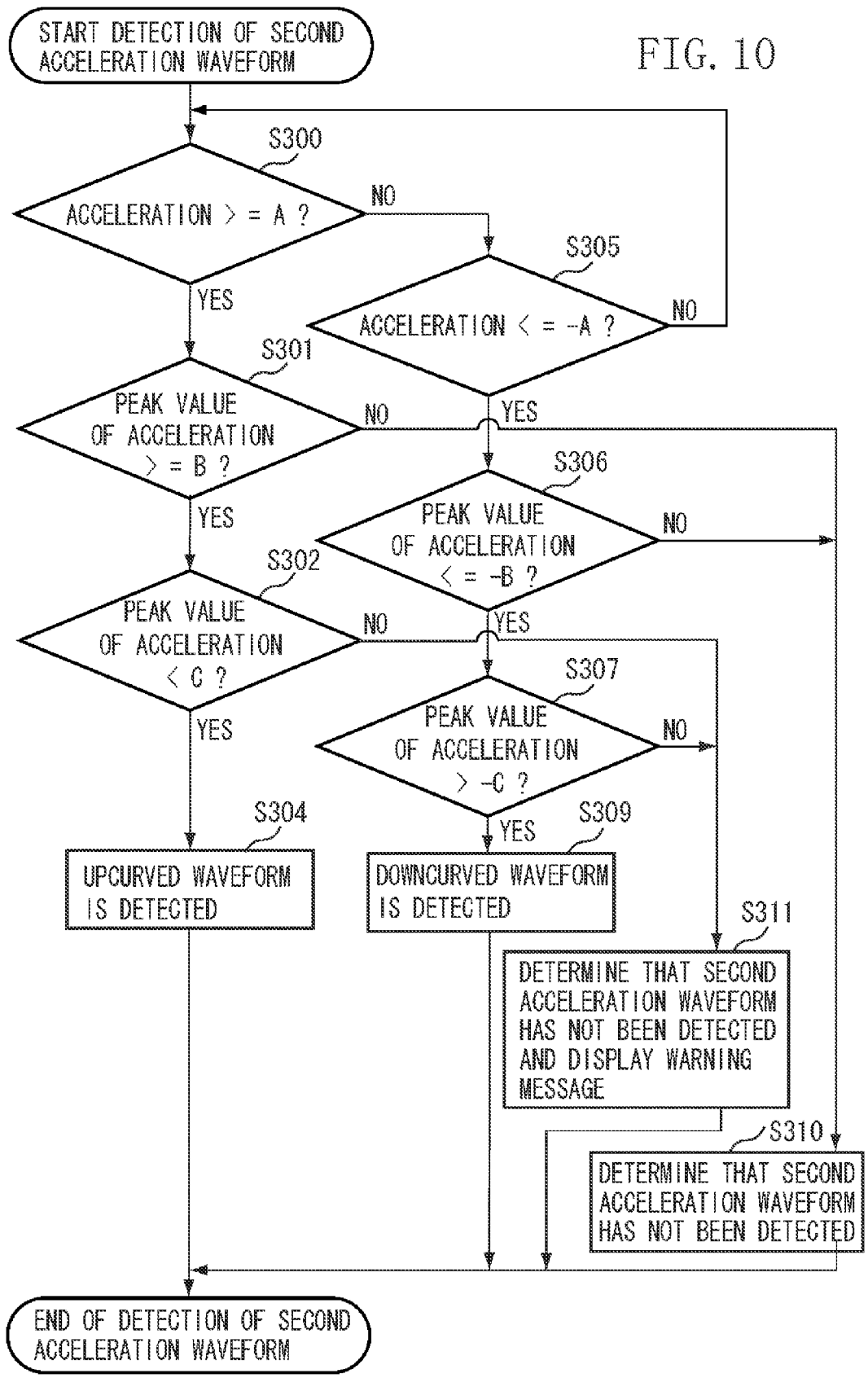
FIG. 10 is a flow chart illustrating an example of processing executed in step S101 illustrated in FIG. 5 by the imaging apparatus according to the second exemplary embodiment of the present invention.

Referring to FIG. 10, in step S302, the operation detection unit 81 determines whether a peak value (maximum value) of the acceleration is smaller than the threshold value C. If it is determined that the peak value (maximum value) of the acceleration is smaller than the threshold value C (Yes in step S302), then the processing advances to step S304. In step S304, the operation detection unit 81 detects a second acceleration waveform as an upcurve waveform. Then, the processing for detecting a second acceleration waveform ends.

On the other hand, if it is determined that the peak value (maximum value) of the acceleration is greater than the threshold value C (No in step S302), then the processing advances to step S311. In step S311, the operation detection unit 81 ends the acceleration waveform detection processing and displays a warning message on the display unit 7, which indicates that the imaging apparatus 1 has been swung with an extremely high swinging intensity. It is also useful if the warning is executed by issuing an alarm sound from a speaker (not illustrated). Then, the processing advances to step S103 (FIG. 5), which is a step after it is determined "No" in step S101 (FIG. 5).

In step S307, the operation detection unit 81 determines whether a peak value (minimum value) of the acceleration is greater than the threshold value −C. If it is determined that the peak value (minimum value) of the acceleration is greater than the threshold value −C (Yes in step S307), then the processing advances to step S309. In step S309, the operation detection unit 81 detects the second acceleration waveform having a downcurve waveform. Then, the second acceleration waveform detection processing ends.

On the other hand, if it is determined that the peak value (minimum value) of the acceleration is equal to or smaller than the threshold value −C (No in step S307), then the processing advances to step S311. In step S311, the operation detection unit 81 ends the acceleration waveform detection processing and displays a warning message on the display unit 7, which indicates that the imaging apparatus 1 has been swung with an extremely high swinging intensity. It is also useful if the warning is executed by issuing an alarm sound from a speaker (not illustrated). Then, the processing advances to step S103 (FIG. 5), which is a step after it is determined "No" in step S101 (FIG. 5).

As described above, in the present exemplary embodiment, in detecting an operation for swinging the imaging apparatus 1, if the user has swung the imaging apparatus 1 with an intensity higher than a predetermined swinging intensity, the imaging apparatus 1 displays a warning message to the user, which indicates that the user has swung the imaging apparatus 1 with an extremely high intensity, so that the user may not throw the imaging apparatus 1 onto the ground by mistake. Accordingly, if the user operates a mobile apparatus such as the imaging apparatus 1, the present exemplary embodiment can prevent an accident such that the imaging apparatus 1 goes out of the operator's (user's) hand or that the user throws away the mobile apparatus or drops it by mistake. If the user has swung the imaging apparatus 1 with too low a swinging intensity, it is also useful if the imaging apparatus 1 displays a warning message indicating that the intensity of swinging the imaging apparatus 1 is too low.

A third exemplary embodiment of the present invention enables the user of a mobile apparatus having an image taking mode and an image reproduction mode, such as an imaging apparatus, to operate the mobile apparatus by swinging the mobile apparatus to execute a function for forwarding or reversing images to be reproduced. The user can view images stored on the storage area 63 via the display unit 7 by executing the image reproduction function.

The present exemplary embodiment will be described by using an imaging apparatus having a configuration similar to that of the first exemplary embodiment described above. FIG. 5 is a flowchart illustrating an example of processing executed by the operation detection unit 81 for detecting an operation for swinging the imaging apparatus 1. Hereinbelow, the processing for detecting an operation for swinging the imaging apparatus 1 will be described in detail with reference to the waveform illustrated in FIG. 4. In the present exemplary embodiment, the configuration different from that of the first exemplary embodiment only will be described in detail.

When the acceleration level exceeds the threshold value A or the threshold value −A illustrated in FIG. 4 (the plot 310 in FIG. 4), the operation detection unit 81 starts processing for detecting an operation for swinging the imaging apparatus 1. When the processing for detecting an operation for swinging the imaging apparatus 1 starts, in step S100 in FIG. 5, the operation detection unit 81 detects a first acceleration waveform. In the present exemplary embodiment, in step S100, similar processing to that in step S100 in the first exemplary embodiment is executed. Accordingly, the description thereof will not be repeated here.

If the first acceleration waveform is detected in step S100, then the processing advances to step S101 to execute the processing for detecting a second acceleration waveform. The processing in step S101 will be described in detail below with reference to FIG. 11.

In steps S102 and S103, in which the operation detection unit 81 determines whether the imaging apparatus 1 has been swung and which direction the imaging apparatus 1 has been swung (upwards or downwards), processing similar to that in steps S102 and S103 in the first exemplary embodiment is executed. Accordingly, the description thereof will not be repeated here.

Now, the processing for detecting a second acceleration waveform (the processing in step S101 in FIG. 5) according to the present exemplary embodiment will be described in detail below with reference to the exemplary waveform corresponding to the swinging operation illustrated in FIG. 4 and a flowchart in FIG. 11, which illustrates an exemplary flow of processing for detecting the second acceleration waveform. In the present exemplary embodiment, processing in steps similar to that described above with reference to FIG. 7 in the first exemplary embodiment will not be described in detail again.

If it is determined that the level of acceleration is larger than or equal to the threshold value A (Yes in step S300) and that the peak value (maximum value) of the second acceleration waveform is larger than or equal to the threshold value B (Yes in step S301), then the processing advances to step S304. In step S304, the operation detection unit 81 detects the second acceleration waveform having an upcurve waveform. Then, the processing advances to step S320.

In step S320, the image displayed on the display unit 7 is changed to a subsequent image. Furthermore, in step S320, the image displayed on the display unit 7 is changed to a previous image at a timing of the plot 313 (FIG. 4), i.e., at the timing at which the level of acceleration exceeds the threshold value A again. In changing the image displayed on the display unit 7, the order of displaying images can be determined based on the file name or file number. It is also useful if the order of displaying images is determined based on the date and time of capturing the images or the date and time of storing the images on the storage area 63.

If it is determined that the level of acceleration is smaller than the threshold value A (No in step S300) and that the peak value of the second acceleration waveform has become equal to or smaller than the threshold value −B before exceeding the threshold value −A again (Yes in step S306), then the processing advances to step S309. In step S309, the operation detection unit 81 detects the second acceleration waveform having a downcurve waveform.

In step S321, the image displayed on the display unit 7 is changed to a previous image at the timing of the plot 313 (FIG. 4), i.e., at the timing at which the level of acceleration exceeds the threshold value A again. In changing the image displayed on the display unit 7, the order of displaying images can be determined based on the file name or file number. It is also useful if the order of displaying images is determined based on the date and time of shooting the images or the date and time of storing the images on the storage area 63. In this case, the order of displaying the images is an order opposite to the order of displaying the images in step S320. However, if the imaging apparatus 1 has a specific mode for determining the order of displaying images at random, such as an image random reproduction mode, the order of displaying the images in the opposite order is not used.

On the other hand, if it is determined that the peak value of the waveform is greater than the threshold value −B and that the acceleration level has exceeded the threshold value −A without decreasing to a level below the threshold value −B (No in step S306), then the processing advances to step S310. In step S310, the operation detection unit 81 determines that no second acceleration waveform has been detected. In this case, the processing advances to step S103 (FIG. 5). Then, the acceleration waveform detection processing immediately ends there and subsequent processing is executed.

As described above, the present exemplary embodiment having the above-described configuration can implement the imaging apparatus 1, which can enable the user to change the direction of changing the images to be displayed based on the direction of swinging the imaging apparatus 1 by swinging the imaging apparatus 1 in a predetermined direction when images are currently displayed in the image reproduction mode. In addition, if a second acceleration waveform is detected, the imaging apparatus 1 according to the present exemplary embodiment determines the direction of swinging the imaging apparatus 1. Accordingly, the imaging apparatus 1 according to the present exemplary embodiment can start the image forward or reverse-displaying processing when the primary operation is executed. Thus, the present exemplary embodiment can implement the imaging apparatus 1 having an operation system that can enable the user to intuitively forward or reverse the images to be reproduced without feeling uncomfortable.

Figure 11:
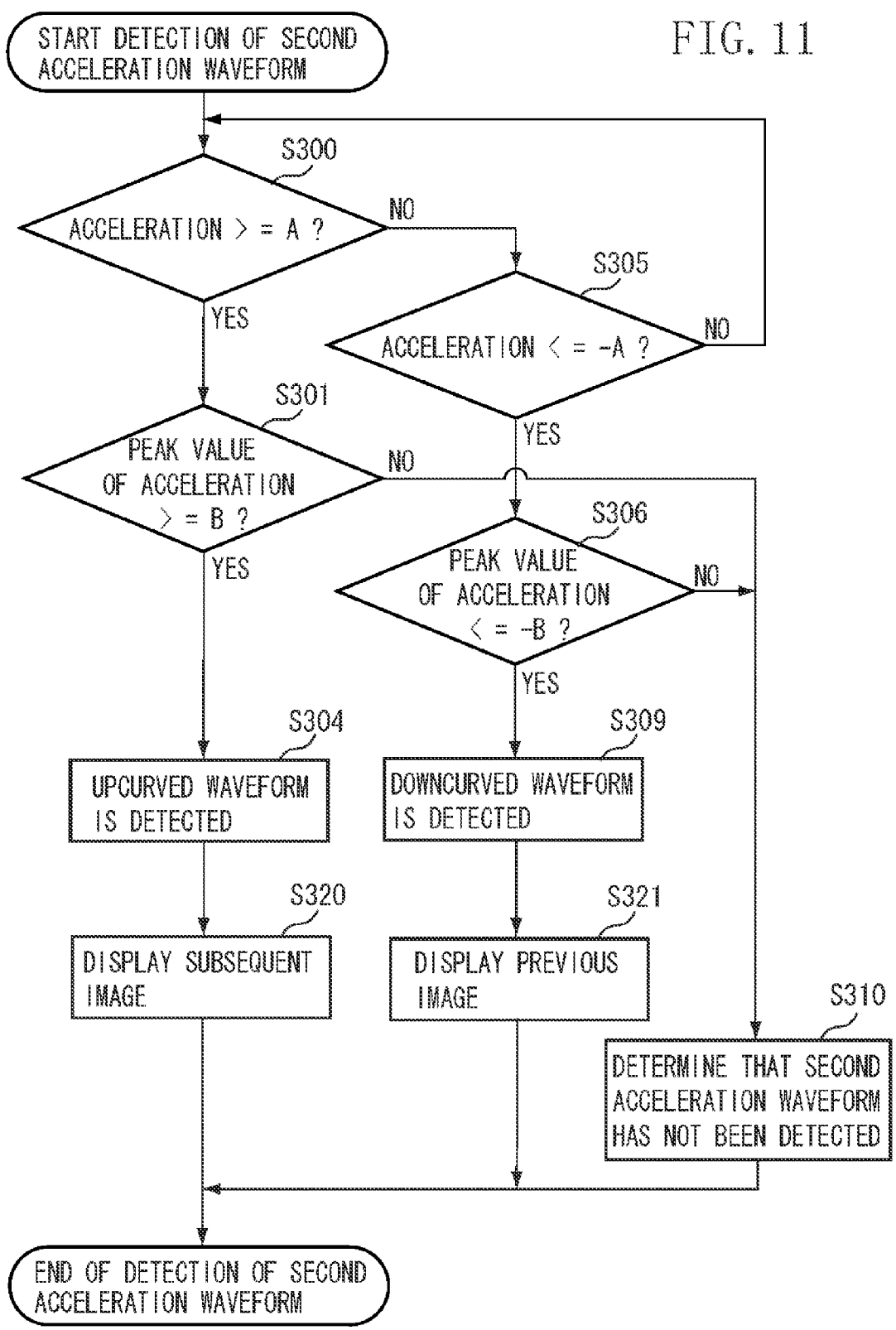
FIG. 11 is a flow chart illustrating an example of processing executed in step S101 illustrated in FIG. 5 by the imaging apparatus according to the third exemplary embodiment of the present invention.

The imaging apparatus 1 according to the present exemplary embodiment executes the processing for detecting a second acceleration waveform (the processing in step S101 in FIG. 5) as described above with reference to the exemplary waveform corresponding to the swinging operation (FIG. 4) and the flow chart of processing for detecting a second acceleration waveform (FIG. 11). However, the present exemplary embodiment is not limited to this. More specifically, in the present exemplary embodiment, it is also useful, in detecting a second acceleration waveform (step S101 in FIG. 5), if the processing in the flow chart in FIG. 9 for detecting a first acceleration waveform is executed in substitution for the processing in the flow chart in FIG. 11.

More specifically, in the processing in the flowchart of FIG. 9 for detecting a first acceleration waveform, the same effect as that of the present exemplary embodiment described above can be achieved if the processing in step S320 is executed after the processing in step S304 and if the processing in step S321 is executed after the processing in step S304.

In the present exemplary embodiment, in steps S320 and S321, the image displayed on the display unit 7 is changed at the timing of the plot 313 illustrated in FIG. 4. However, the present exemplary embodiment is not limited to this to achieve the above-described effect. More specifically, it is also useful if the image displayed on the display unit 7 is changed at the timing of the plot 312 (the timing at which the level of acceleration exceeds the threshold value B) or at the timing of the plot 315 (the timing at which the level of acceleration exceeds the threshold value B again). In addition, it is also useful if the image displayed on the display unit 7 is changed at any arbitrary timing other than the plot 313 between the plot 312 and 313.

A fourth exemplary embodiment enables the user of a mobile apparatus having an image taking mode and an image reproduction mode, such as an imaging apparatus, to operate the mobile apparatus by swinging the mobile apparatus to execute a function for forwarding or reversing images to be reproduced. In addition, if the user has serially executed a plurality of swinging operations, the present exemplary embodiment detects waveforms of the swinging operations to appropriately control the image forwarding and reversing processing. The user can view images stored on the storage area 63 via the display unit 7 by executing the image reproduction function.

Figure 12:
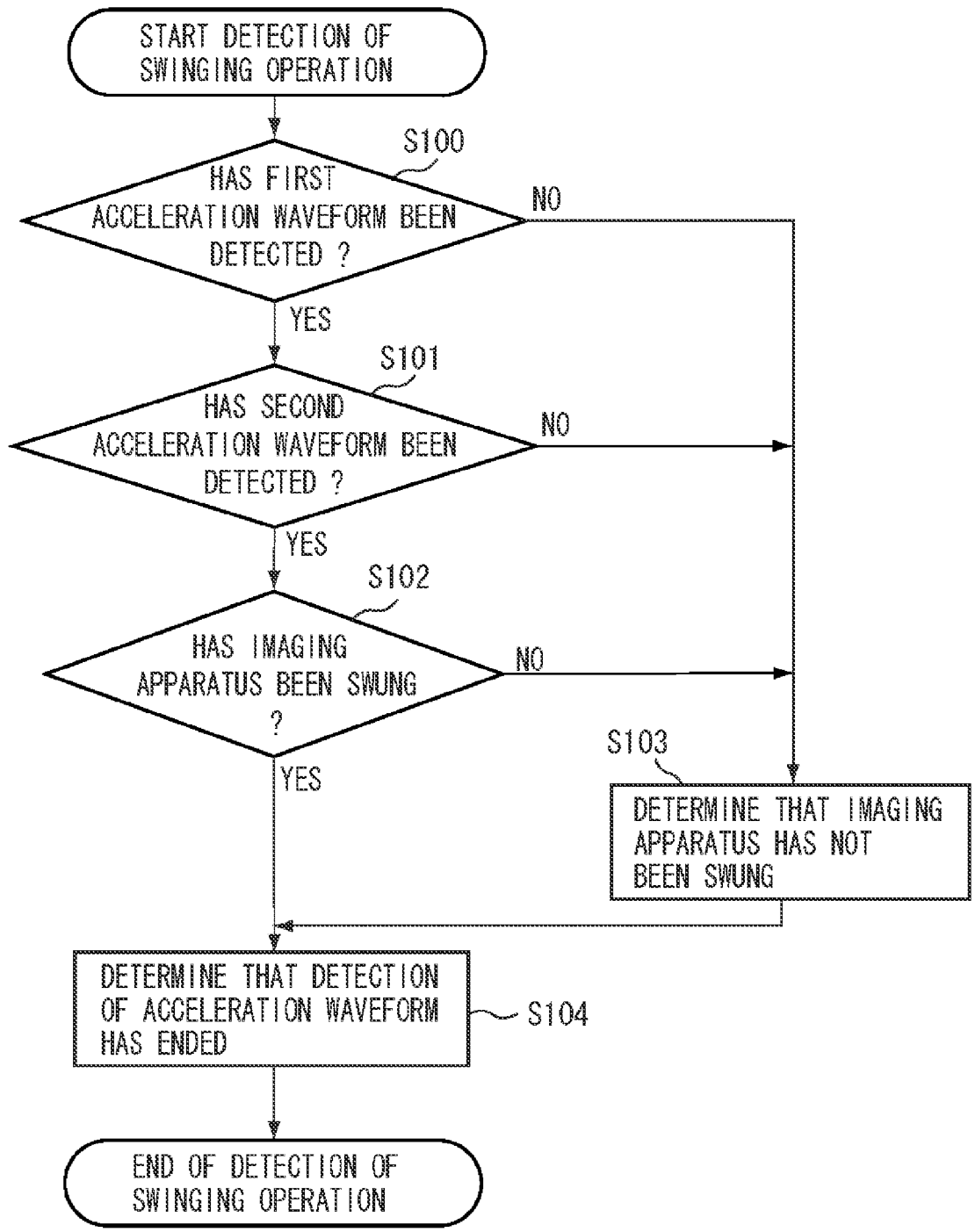
FIG. 12 is a flow chart illustrating an example of processing for detecting a swinging operation, which is executed by the imaging apparatus according to a fourth exemplary embodiment of the present invention.

FIG. 12 is a flow chart illustrating an example of processing executed by the operation detection unit 81 for detecting an operation for swinging the imaging apparatus 1. Hereinbelow, the processing for detecting an operation for swinging the imaging apparatus 1 will be described in detail with reference to the waveform illustrated in FIG. 4. In the present exemplary embodiment, the configuration different from that of the first exemplary embodiment only will be described in detail.

When the acceleration level exceeds the threshold value A or the threshold value –A illustrated in FIG. 4 (the plot 310 in FIG. 4), the operation detection unit 81 starts processing for detecting an operation for swinging the imaging apparatus 1. When the processing for detecting an operation for swinging the imaging apparatus 1 starts, in step S100, the operation detection unit 81 detects a first acceleration waveform. In the present exemplary embodiment, in step S100, the same processing as that in step S100 in the second exemplary embodiment is executed. Accordingly, the description thereof will not be repeated here. If a first acceleration waveform is detected (Yes in step S100), then the processing advances to step S101.

If the first acceleration waveform is detected in step S100, then the processing advances to step S101 to execute the processing for detecting a second acceleration waveform. The processing in step S101 will be described in detail below with reference to FIG. 13.

In step S102, the operation detection unit 81 determines the direction of swinging the imaging apparatus 1 (upwards or downwards). The processing in step S102 is similar to that in step S102 in the first exemplary embodiment. Accordingly, the description thereof will not be repeated here. If it is determined that the imaging apparatus 1 has been swung (Yes in step S102), then, the processing advances to step S104. If it is determined that the first acceleration waveform has not been detected (No in step S100), that the second acceleration waveform has not been detected (No in step S101), or that the imaging apparatus 1 has not been swung (No in step S102), then the processing advances to step S103. In step S103, the operation detection unit 81 immediately determines that no swinging operation has been detected. Then, the processing advances to step S104.

In step S104, if it is detected that the imaging apparatus 1 has not been swung for a predetermined length of time, then the operation detection unit 81 determines that the swinging operation has been discontinued. Furthermore, in this case, in step S104, the operation detection unit 81 determines that the processing for detecting an acceleration waveform has ended. Then, the swinging operation detection processing ends. The processing in step S104 will be described in detail below with reference to FIG. 14.

Figure 13:
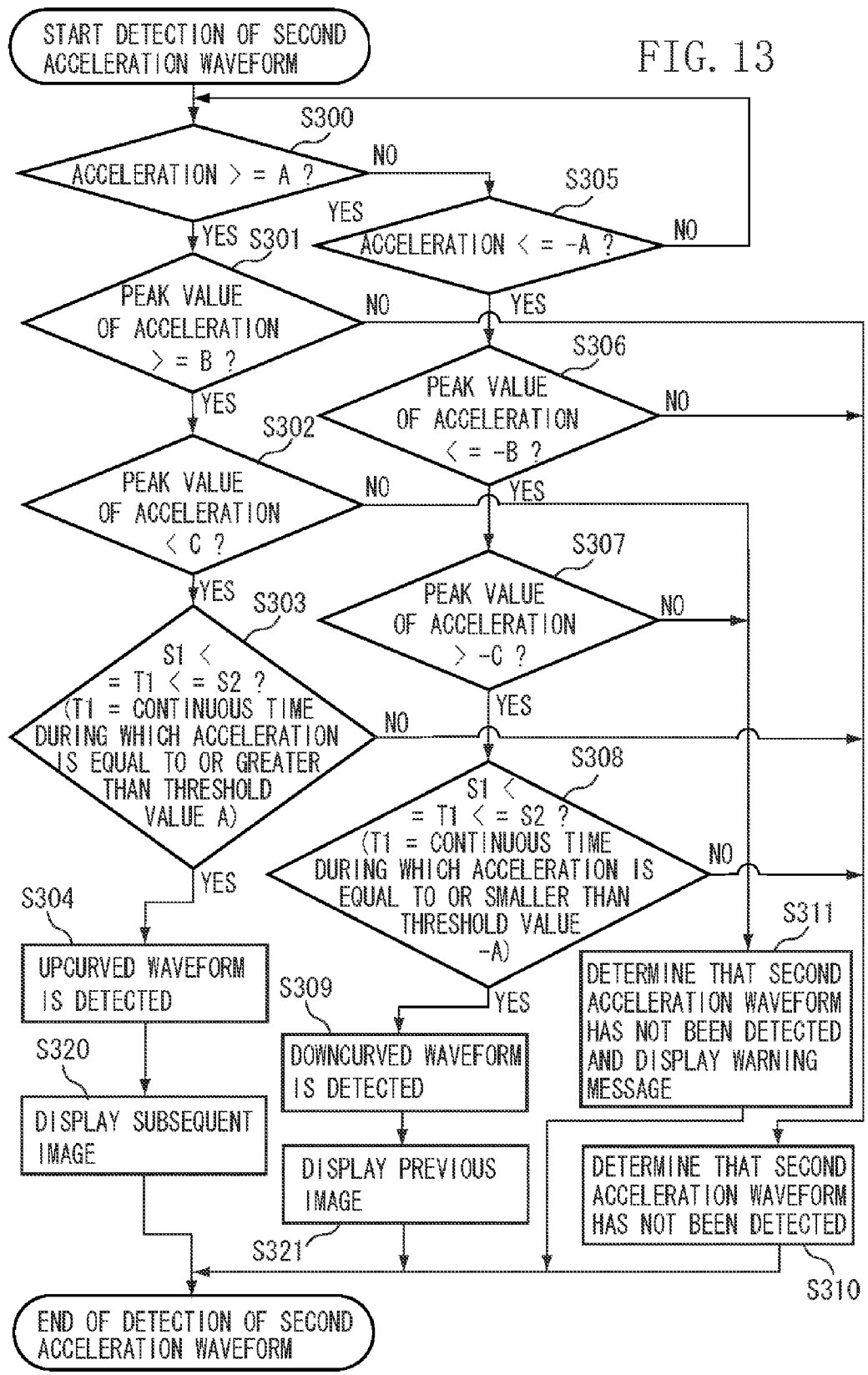
FIG. 13 is a flow chart illustrating an example of processing executed in step S101 illustrated in FIG. 12 by the imaging apparatus according to the fourth exemplary embodiment of the present invention.

Now, processing for detecting a second acceleration waveform (processing in step S101 illustrated in FIG. 12) according to the present exemplary embodiment will be described in detail below with reference to the exemplary waveform corresponding to the swinging operation illustrated in FIG. 4 and an exemplary flow of processing for detecting a second acceleration waveform illustrated in FIG. 13.

Immediately after the first acceleration waveform is detected in step S100 (FIG. 12), in step S300 (FIG. 13), the operation detection unit 81 determines whether the level of acceleration has increased to a level equal to or greater than the threshold value A. If it is determined that the level of acceleration has increased to the level equal to or greater than the threshold value A (Yes in step S300), then the processing advances to step S301. In step S301, the operation detection unit 81 detects a peak value (maximum value) during a time period when the level of acceleration is equal to or greater than the threshold value A. The acceleration level is detected based on a detection period of the swing detection sensor 83, which is controlled by the detection period control unit 84.

Accordingly, the peak value (maximum value) of the waveform detected after exceeding the threshold value A can be measured by overwriting the peak value (maximum value) when the peak value (maximum value) after exceeding the threshold value A is updated. If it is determined that the peak value (maximum value) of the waveform is equal to or larger than the threshold value B (Yes in step S301), then, the processing advances to step S302.

On the other hand, if it is determined that the peak value (maximum value) of the waveform is smaller than the threshold value B and that the level of acceleration has decreased to a level below the threshold value A without exceeding the threshold value B (No in step S301), then the processing advances to step S310. In step S310, the operation detection unit 81 determines that no second acceleration waveform has been detected.

In step S302, the operation detection unit 81 determines whether a peak value (maximum value) of the acceleration is smaller than the threshold value C. If it is determined that the peak value (maximum value) of the acceleration is smaller than the threshold value C (Yes in step S302), then the processing advances to step S303. On the other hand, if it is determined that the peak value (maximum value) of the acceleration is equal to or greater than the threshold value C (No in step S302), then the processing advances to step S311. In step S311, the operation detection unit 81 ends the acceleration waveform detection processing and displays a warning message on the display unit 7, which indicates that the imaging apparatus 1 has been swung with an extremely high swinging intensity.

It is also useful if the warning is executed by issuing an alarm sound from a speaker (not illustrated). Then, the processing advances to step S103 (FIG. 12), which is a step after it is determined "No" in step S101 (FIG. 12).

In step S303, the operation detection unit 81 determines whether the time t1, in which the level of acceleration is equal to or greater than the threshold value A, is equal to or greater than the threshold value S1 and equal to or smaller than the threshold value S2. If it is determined that the time t1, in which the level of acceleration is equal to or greater than the threshold value A, is equal to or greater than the threshold value S1 and equal to or smaller than the threshold value S2 (Yes in step S303), then the processing advances to step S304. In step S304, the operation detection unit 81 detects the second acceleration waveform as an upcurve waveform. Then, the processing advances to step S320.

In step S320, the image displayed on the display unit 7 is changed to a subsequent image. Furthermore, in step S320, the image displayed on the display unit 7 is changed to a previous image at a timing of the plot 313 (FIG. 4), i.e., at the timing at which the level of acceleration exceeds the threshold value A again. In changing the image displayed on the display unit 7, the order of displaying images can be determined based on the file name or file number. It is also useful if the order of displaying images is determined based on the date and time of shooting the images or the date and time of storing the images on the storage area 63. Then, the processing for detecting a second acceleration waveform ends.

On the other hand, if it is determined that the time t1, in which the level of acceleration is equal to or greater than the threshold value A, is smaller than the threshold value S1 or greater than the threshold value S2 (No in step S303), then the processing advances to step S310. In step S310, the operation detection unit 81 determines that no second acceleration waveform has been detected.

Immediately after the first acceleration waveform is detected in step S100 (FIG. 12), in step S300 (FIG. 13), the operation detection unit 81 determines whether the level of acceleration has increased to a level equal to or greater than the threshold value A. If it is determined that the level of acceleration is below the threshold value A (No in step S300), then the processing advances to step S305. In step S305, the operation detection unit 81 determines whether the level of acceleration has decreased to a level equal to or smaller than the threshold value −A. If it is determined that the level of acceleration has decreased to a level equal to or smaller than the threshold value −A (Yes in step S305), then the processing advances to step S306. In step S306, the operation detection unit 81 determines whether a peak value (minimum value) of a time period, in which the level of acceleration is equal to or smaller than the threshold value −A, is equal to or smaller than the threshold value −B. If it is determined that the peak value (minimum value) during the time period, in which the level of acceleration is equal to or smaller than the threshold value −A, has become equal to or smaller than the threshold value −B before exceeding the threshold value −A again (Yes in step S306), then the processing advances to step S307.

On the other hand, if it is determined that the peak value of the waveform is greater than the threshold value −B and that the acceleration level has exceeded the threshold value −A without decreasing to a level below the threshold value −B (No in step S306), then the processing advances to step S310. In step S310, the operation detection unit 81 determines that no second acceleration waveform has been detected.

In step S307, the operation detection unit 81 determines whether a peak value (minimum value) of the acceleration is greater than the threshold value −C. If it is determined that the peak value (minimum value) of the acceleration is greater than the threshold value −C (Yes in step S307), then the processing advances to step S308. On the other hand, if it is determined that the peak value (minimum value) of the acceleration is equal to or smaller than the threshold value −C (No in step S307), then the processing advances to step S311. In step S311, the operation detection unit 81 ends the acceleration waveform detection processing and displays a warning message on the display unit 7, which indicates that the imaging apparatus 1 has been swung with an extremely high swinging intensity.

It is also useful if the warning is executed by issuing an alarm sound from a speaker (not illustrated). Then, the processing advances to step S103 (FIG. 12), which is a step after it is determined "No" in step S101 (FIG. 12).

In step S308, the operation detection unit 81 determines whether the time t1, in which the level of acceleration is equal to or smaller than the threshold value −A, is equal to or greater than the threshold value S1 and equal to or smaller than the threshold value S2. If it is determined that the time t1, in which the level of acceleration is equal to or smaller than the threshold value −A, is equal to or greater than the threshold value S1 and equal to or smaller than the threshold value S2 (Yes in step S308), then the processing advances to step S309. In step S309, the operation detection unit 81 detects the second acceleration waveform as a downcurve waveform. Then, the processing advances to step S321.

In step S321, the image displayed on the display unit 7 is changed to a previous image. More specifically, in step S321, the image displayed on the display unit 7 is changed to a previous image at the timing of the plot 313 (FIG. 4), i.e., at the timing at which the level of acceleration exceeds the threshold value A again.

In changing the image displayed on the display unit 7, the order of displaying images can be determined based on the file name or file number. It is also useful if the order of displaying images is determined based on the date and time of capturing the images or the date and time of storing the images on the storage area 63. In this case, the order of displaying the images is an order opposite to the order of displaying the images in step S320. However, if the imaging apparatus 1 has a specific mode for determining the order of displaying images at random, such as an image random reproduction mode, the order of displaying the images in the opposite order is not used. Then, the processing for detecting a second acceleration waveform ends.

On the other hand, if it is determined that the time t1, in which the level of acceleration is equal to or smaller than the threshold value −A, is smaller than the threshold value S1 or greater than the threshold value S2 (No in step S308), then the processing advances to step S310. In step S310, the operation detection unit 81 determines that no second acceleration waveform has been detected. After it is determined that no second acceleration waveform has been detected in step S310, then the processing advances to step S103 (FIG. 12). In step S103 (FIG. 12), the operation detection unit 81 determines that no acceleration waveform has been detected in the acceleration waveform detection processing. Then, the processing advances to step S104 (FIG. 12).

In the present exemplary embodiment, in steps S320 and S321, the image displayed on the display unit 7 is changed at the timing of the plot 313 illustrated in FIG. 4. However, the present exemplary embodiment is not limited to this to achieve the above-described effect. More specifically, it is also useful if the image displayed on the display unit 7 is changed at the timing of the plot 312 (the timing at which the level of acceleration exceeds the threshold value B) or at the timing of the plot 315 (the timing at which the level of acceleration exceeds the threshold value B again). In addition, it is also useful if the image displayed on the display unit 7 is changed at any arbitrary timing other than the plot 313 between the plot 312 and 313.

Now, processing for detecting that the processing for detecting an acceleration waveform has ended according to the present exemplary embodiment will be described in detail below with reference to the exemplary waveform corresponding to the swinging operation illustrated in FIG. 4 and an exemplary flow of processing for detecting the end of acceleration waveform detection processing illustrated in FIG. 14.

Figure 14:
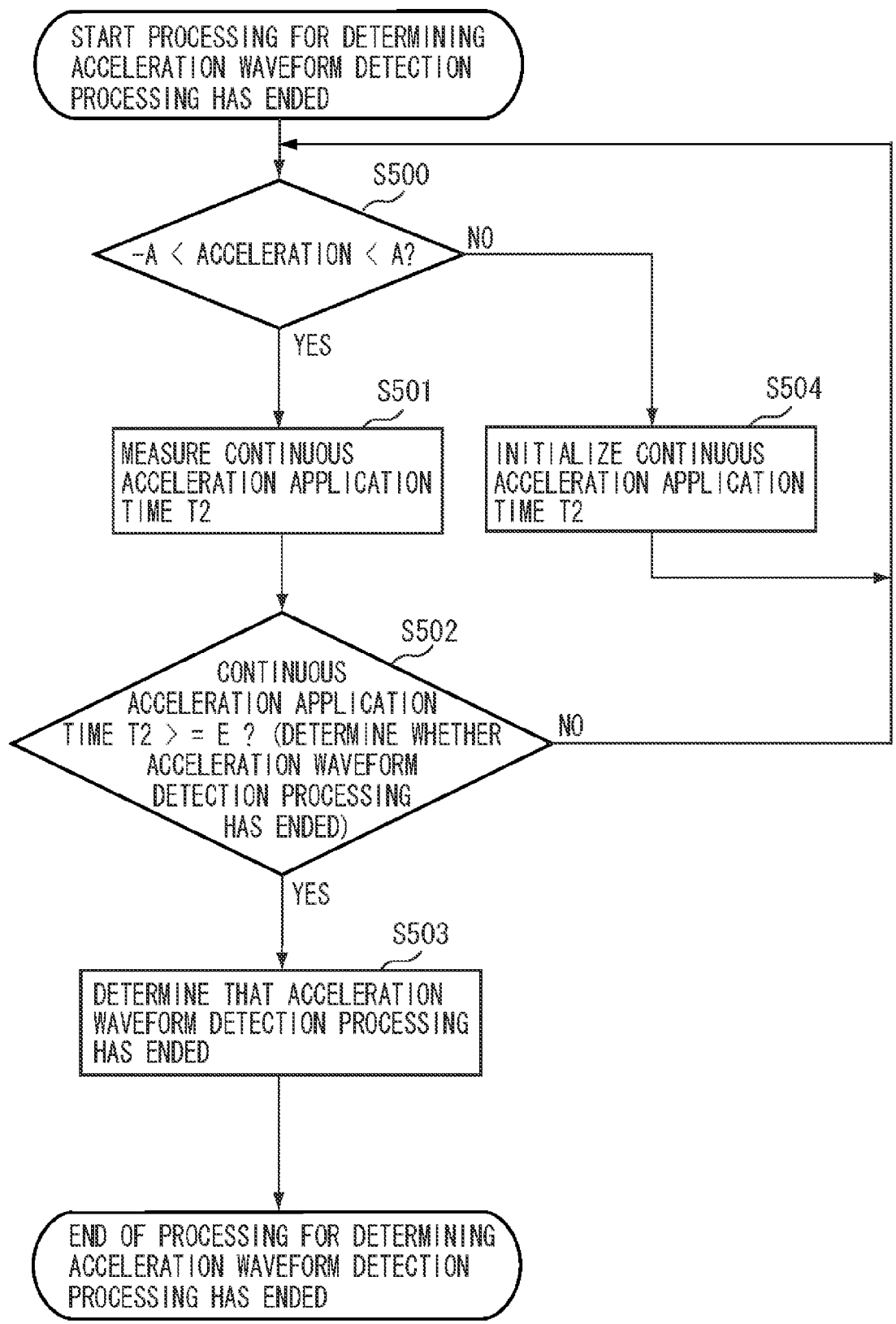
FIG. 14 is a flow chart illustrating an example of processing executed in step S104 illustrated in FIG. 12 by the imaging apparatus according to the fourth exemplary embodiment of the present invention.

Referring to FIG. 14, in step S500, the operation detection unit 81 determines whether the current level of acceleration is greater than the threshold value −A and smaller than the threshold value A. If it is determined that the current level of acceleration is greater than the threshold value −A and smaller than the threshold value A (Yes in step S500), then the processing advances to step S501.

In step S501, the operation detection unit 81 counts a time t2 (acceleration continuance time), in which the level of acceleration continues to fall within the range of the value greater than the threshold value −A and smaller than the threshold value A. Then, the processing advances to step S502. In step S502, if the acceleration continuance time t2 is equal to or greater than the threshold value E (Yes in step S502), then, the processing advances to step S503. In step S503, it is determined that the acceleration waveform detection processing has ended. On the other hand, if it is determined that the acceleration continuance time t2 is smaller than the threshold value E (NO in step S502), then the processing returns to step S500 while continuously counting the acceleration continuance time t2.

On the other hand, if it is determined that the current level of acceleration is equal to or smaller than the threshold value −A or equal to or greater than the threshold value A (No in step S500), then the processing advances to step S504. In step S504, the acceleration continuance time t2 is initialized. Then, the processing returns to step S500 and the determination in step S500 is executed again.

In this case, if it is determined that the level of acceleration is greater than the threshold value −A and smaller than the threshold value A, then it is determined that one swinging operation has continued since a timing at which the level of acceleration first exceeded the threshold value A or the threshold value −A. Therefore, the waveform 303 illustrated in FIG. 4 is regarded as corresponding to one continuous operation to which the waveforms 301 and 302 correspond. Thus, the present exemplary embodiment can prevent erroneously determining that a third acceleration waveform is a waveform corresponding to another additional swing.

As described above, in the present exemplary embodiment, if an acceleration whose level is equal to or greater than a predetermined level is detected and if the value of the time in which the acceleration is continued is smaller or greater than a predetermined threshold value, then a swinging operation error is detected (i.e., the operation in this case is not detected as a swinging operation). In addition, if the stationary state of the imaging apparatus 1 is not continued for a time period equal to or longer than a predetermined time length, the present exemplary embodiment detects that one swinging operation has continued. Thus, the present exemplary embodiment can accurately detect a first, a second, and a third acceleration waveform, which constitute the preparatory operation and the primary operation. With the above-described configuration, the present exemplary embodiment can implement an operation system that can implement an accurate detection of an acceleration waveform and enable the user to intuitively operate the imaging apparatus 1 with a simple operation.

As described above, each of the exemplary embodiments of the present invention implements the method for detecting an operation for swinging an imaging apparatus. However, the present invention is not limited to this. More specifically, it is also useful if an operation other than an operation for swinging an imaging apparatus, which can be detected by an acceleration sensor, such as swaying, or shaking an imaging apparatus is detected. In addition, each of the exemplary embodiments of the present invention having the above-described configuration implements the method for detecting an acceleration waveform. However, the present invention is not limited to this. More specifically, it is also useful if a predetermined operation is detected based on an acceleration waveform that has been subjected to filtering with a high pass filter or a low pass filter.

In each of the above-described exemplary embodiments of the present invention, the user operation is detected in the direction of the X-axis only. However, the present invention is not limited to this. More specifically, it is also useful if the user operation is detected in a plurality of axes including Y- and Z-axes in combination. In this case, the Z-axis can be set in the direction of the optical axis of a camera lens (not illustrated) and a threshold value is set based on an operation to be detected and the type of the operation.

Furthermore, as described above, in the third and the fourth exemplary embodiments, still images are reproduced. However, the present exemplary embodiment is not limited to this. More specifically, it is also useful if a moving image is reproduced by executing functions for reproducing, stopping or pausing, forwarding, and reversing captured moving images by detecting an operation for swinging the imaging apparatus 1.

In addition, in each of the above-described exemplary embodiments of the present invention, a predetermined operation is detected based on detected acceleration. However, the present exemplary embodiment is not limited to this. More specifically, it is also useful if a predetermined operation is detected by using a method for detecting an angular velocity or vibration. Furthermore, the present invention is not limited to an imaging apparatus. More specifically, each of the above-described exemplary embodiments of the present invention can be implemented on an electronic apparatus and a communication apparatus capable of taking an image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034028 filed Feb. 17, 2009, which is hereby incorporated by reference herein in its entirety.

What is claimed is:

1. An electronic apparatus comprising:
an acceleration detection unit configured to detect acceleration applied to the electronic apparatus; and
a control unit configured to control a predetermined function to be performed in a case where the acceleration detected by the acceleration detection unit reaches a first threshold value and then reaches a second threshold value which has an opposite sign to a sign of the first threshold value and which is larger than the first threshold value in absolute value,
wherein acceleration components which have opposite signs to each other are acceleration components which are in opposite directions to each other on a same axis,
wherein the control unit is configured to use both the first threshold value and the second threshold value for determining whether a swinging operation is performed or not, and
wherein the predetermined function is performed according to the swinging operation.

2. The electronic apparatus according to claim 1, wherein the control unit is configured to control the predetermined function to be performed when the acceleration detected by the acceleration detection unit further reaches a third threshold value, which has a same sign as the sign of the second threshold value and which is smaller than the second threshold value in absolute value, after reaching the first threshold value and then reaching the second threshold value which has the opposite sign to the sign of the first threshold value and which is larger than the first threshold value in absolute value.

3. The electronic apparatus according to claim 1, wherein the control unit includes a direction determination unit configured to determine a swinging direction of the electronic apparatus, and wherein the direction determination unit is configured to determine the swinging direction based on the sign of one of the first threshold value and the second threshold value.

4. The electronic apparatus according to claim 3, further comprising:
a display unit configured to display an image stored in the electronic apparatus; and
a change unit configured to change, as the predetermined function, the image displayed on the display unit.

5. The electronic apparatus according to claim 4, wherein the change unit is configured to change the image displayed on the display unit, depending on the swinging direction.

6. The electronic apparatus according to claim 3, further comprising:
a display unit configured to display a moving image stored in the electronic apparatus; and
an execution unit configured to execute, as the predetermined function, an operation of reproducing or stopping the moving image displayed on the display unit.

7. The electronic apparatus according to claim 3, further comprising:
a display unit configured to display a moving image stored in the electronic apparatus; and
an execution unit configured to execute, as the predetermined function, an operation of forwarding or rewinding the moving image displayed on the display unit.

8. The electronic apparatus according to claim 3, further comprising a warning unit configured to issue a warning when the acceleration detected by the acceleration detection unit reaches a fourth threshold value which has the same sign as the sign of the second threshold value and which is larger than the second threshold value in absolute value.

9. The electronic apparatus according to claim 8, wherein the warning unit serves as a sound production unit to produce a warning sound.

10. The electronic apparatus according to claim 1, further comprising an imaging unit.

11. The electronic apparatus according to claim 1, wherein the control unit is configured to not perform the predetermined function if the acceleration detected by the acceleration detection unit does not reach the second threshold value even if the acceleration detected by the acceleration detection unit reaches a value which has an opposite sign to a sign of the first threshold value and which is equal to the first threshold value in absolute value after the acceleration detected by the acceleration detection unit reaches the first threshold value.

12. The electronic apparatus according to claim 1, wherein the control unit is configured to perform the predetermined function if the acceleration detected by the acceleration detection unit reaches the second threshold value even if the acceleration detected by the acceleration detection unit does not reach a value which has an same sign to a sign of the first threshold value and which is equal to the second threshold value in absolute value after the acceleration detected by the acceleration detection unit reaches the first threshold value.

13. A method comprising:
detecting acceleration applied to an electronic apparatus; and
controlling a predetermined function to be performed in a case where the detected acceleration reaches a first threshold value and then reaches a second threshold value which has an opposite sign to a sign of the first threshold value and which is larger than the first threshold value in absolute value,
wherein acceleration components which have opposite signs to each other are acceleration components which are in opposite directions to each other on a same axis,
wherein the controlling uses both the first threshold value and the second threshold value for determining whether a swinging operation is performed or not, and
wherein the predetermined function is performed according to the swinging operation.

14. The method according to claim 13, wherein the controlling the predetermined function to be performed when the acceleration reaches a third threshold value, which has a same sign as the sign of the second threshold value and which is smaller than the second threshold value in absolute value, after reaching the first threshold value and then reaching the second threshold value which has the opposite sign to the sign of the first threshold value and which is larger than the first threshold value in absolute value.

15. The method according to claim 13, further comprising determining a swinging direction of the electronic apparatus, and
wherein the determining the swinging direction is based on the sign of one of the first threshold value and the second threshold value.

16. A non-transitory computer readable storage medium storing a computer-executable program of instructions for causing a computer to perform a method comprising:
detecting acceleration applied to an electronic apparatus; and
controlling a predetermined function to be performed in a case where the detected acceleration reaches a first threshold value and then reaches a second threshold value which has an opposite sign to a sign of the first threshold value and which is larger than the first threshold value in absolute value,
wherein acceleration components which have opposite signs to each other are acceleration components which are in opposite directions to each other on a same axis,
wherein the controlling uses both the first threshold value and the second threshold value for determining whether a swinging operation is performed or not, and
wherein the predetermined function is performed according to the swinging operation.

17. The non-transitory computer readable storage medium according to claim 16, wherein the controlling the predetermined function to be performed when the acceleration reaches a third threshold value, which has a same sign as the sign of the second threshold value and which is smaller than the second threshold value in absolute value, after reaching the first threshold value and then reaching the second threshold value which has the opposite sign to the sign of the first threshold value and which is larger than the first threshold value in absolute value.

18. The non-transitory computer readable storage medium according to claim 16, further comprising determining a swinging direction of the electronic apparatus, and
wherein the determining the swinging direction is based on the sign of one of the first threshold value and the second threshold value.

19. A detection apparatus comprising:
an acceleration detection unit configured to detect acceleration applied to the detection apparatus; and
a control unit configured to control a predetermined function to be performed in a case where, after the acceleration detected by the acceleration detection unit reaches a first threshold value and then reaches a second threshold value which has an opposite sign to a sign of the first threshold value and which is larger than the first threshold value in absolute value, a period in which the acceleration is equal to or larger than an absolute value of a third threshold value, which has a same sign as the sign of the second threshold value and which is smaller than the second threshold value in absolute value, is in a predetermined range, wherein the control unit is configured to use both the first threshold value and the second threshold value for determining whether a swinging operation is performed or not, and wherein the predetermined function is performed according to the swinging operation.

20. A method comprising:

detecting acceleration applied to an apparatus; and controlling a predetermined function to be performed in a case where, after the acceleration reaches a first threshold value and then reaches a second threshold value which has an opposite sign to a sign of the first threshold value and which is larger than the first threshold value in absolute value, a period in which the acceleration is equal to or larger than an absolute value of a third threshold value, which has a same sign as the sign of the second threshold value and which is smaller than the second threshold value in absolute value, is in a predetermined range, wherein the controlling uses both the first threshold value and the second threshold value for determining whether a swinging operation is performed or not, and wherein the predetermined function is performed according to the swinging operation.

21. A non-transitory computer readable storage medium storing a computer-executable program of instructions for causing a computer to perform a method comprising:

detecting acceleration applied to an apparatus; and controlling a predetermined function to be performed in a case where, after the acceleration reaches a first threshold value and then reaches a second threshold value which has an opposite sign to a sign of the first threshold value and which is larger than the first threshold value in absolute value, a period in which the acceleration is equal to or larger than an absolute value of a third threshold value, which has a same sign as the sign of the second threshold value and which is smaller than the second threshold value in absolute value, is in a predetermined range, wherein the controlling uses both the first threshold value and the second threshold value for determining whether a swinging operation is performed or not, and wherein the predetermined function is performed according to the swinging operation.

* * * * *